US006735434B2

(12) United States Patent
Criss et al.

(10) Patent No.: US 6,735,434 B2
(45) Date of Patent: *May 11, 2004

(54) WIRELESS SOFTWARE UPGRADES WITH VERSION CONTROL

(75) Inventors: Mark A. Criss, The Woodlands, TX (US); Paul A. Cowan, Hinckley, OH (US)

(73) Assignee: Symbol Technologies, Inc., Holtsville, NY (US)

( * ) Notice: Subject to any disclaimer, the term of this patent is extended or adjusted under 35 U.S.C. 154(b) by 133 days.

This patent is subject to a terminal disclaimer.

(21) Appl. No.: 09/876,491

(22) Filed: Jun. 7, 2001

(65) Prior Publication Data

US 2001/0029178 A1 Oct. 11, 2001

(Under 37 CFR 1.47)

Related U.S. Application Data

(63) Continuation of application No. 09/234,813, filed on Jan. 21, 1999, now Pat. No. 6,308,061, which is a continuation-in-part of application No. 09/208,785, filed on Dec. 10, 1998, which is a continuation-in-part of application No. 09/023,857, filed on Feb. 13, 1998, now Pat. No. 6,031,830, which is a continuation of application No. 08/694,637, filed on Aug. 7, 1996, now Pat. No. 5,848,064.

(51) Int. Cl.[7] ............................................... H04M 3/00
(52) U.S. Cl. ....................... 455/418; 455/419; 455/550
(58) Field of Search ................................ 455/418, 419, 455/420, 422.1, 550–558; 709/220, 221, 222; 713/153, 168, 190, 193, 200, 201

(56) References Cited

U.S. PATENT DOCUMENTS 5,155,847 A  * 10/1992  Kirouac et al. ............. 709/221
5,666,293 A  *  9/1997  Metz et al. .................. 709/220
6,308,061 B1 * 10/2001  Criss et al. .................. 455/418
6,378,069 B1 *  4/2002  Sandler et al. ............. 713/153

* cited by examiner

Primary Examiner—Duc M. Nguyen
(74) Attorney, Agent, or Firm—Renner, Otto, Boisselle & Sklar, LLP

(57) ABSTRACT

A wireless communication system includes a system backbone, a host computer coupled to the system backbone, at least one base station coupled to the system backbone, the at least one base station including a base station transceiver for communicating wirelessly with mobile devices within the system, and at least one mobile device having a mobile device transceiver for communicating wirelessly with the host computer on the system backbone via the at least one base station. The at least one mobile device includes a software update schedule table for providing one or more times at which the mobile device is to inquire and obtain available software upgrades. Entries in the software update schedule table may be made manually through a user input associate with the at least one mobile device or wirelessly through communications received from the host computer. In the event the mobile device is in a sleep mode during a scheduled time for conducting an inquiry as to whether any upgrades of operating software is available, a processor of the mobile device is configured to temporarily place the mobile device in a fully operation mode until a process of determining and obtaining any upgrades operating software is complete.

22 Claims, 28 Drawing Sheets

Bootptab Table:

| Mobile Terminal Hardware Address | Internet Protocol (IP) Address | Boot File (Package Name) |
|---|---|---|
| Mobile Terminal 1 | IP1 | Package A |
| Mobile Terminal 2 | IP2 | Package B |
| Mobile Terminal 3 | IP3 | Package C |
| ... | ... | ... |
| Mobile Terminal X | Ipx | Package X |

Fig. 4

Package Definition Files:

Fig. 5a

| Package Name | Version ID, Req. Memory, Mode | File Name | Mobile Ter. Path | FTP Path | Type | ROM/RAM |
|---|---|---|---|---|---|---|

Fig. 5b

| Package A | 6.2, 200KB, replace | filename_A1<br>filename_A2<br>.<br>.<br>filename_An | mpath A1<br>mpath A2<br>.<br>.<br>mpath An | ftppath A1<br>ftppath A2<br>.<br>.<br>ftppath An | ...<br>...<br>.<br>.<br>... | ROM<br>RAM<br>.<br>.<br>ROM |
|---|---|---|---|---|---|---|

Fig. 5c

| Package B | A3, 150KB, fail safe | filename_B1<br>filename_B2<br>.<br>.<br>filename_Bn | mpath B1<br>mpath B2<br>.<br>.<br>mpath Bn | ftppath B1<br>ftppath B2<br>.<br>.<br>ftppath Bn | ...<br>...<br>.<br>.<br>... | RAM<br>RAM<br>.<br>.<br>ROM |
|---|---|---|---|---|---|---|

| Package Z | 1.9, 320KB, replace | filename_Z1<br>filename_Z2<br>.<br>.<br>filename_Zn | mpath Z1<br>mpath Z2<br>.<br>.<br>mpath Zn | ftppath Z1<br>ftppath Z2<br>.<br>.<br>ftppath Zn | ...<br>...<br>.<br>.<br>... | ROM<br>ROM<br>.<br>.<br>RAM |
|---|---|---|---|---|---|---|

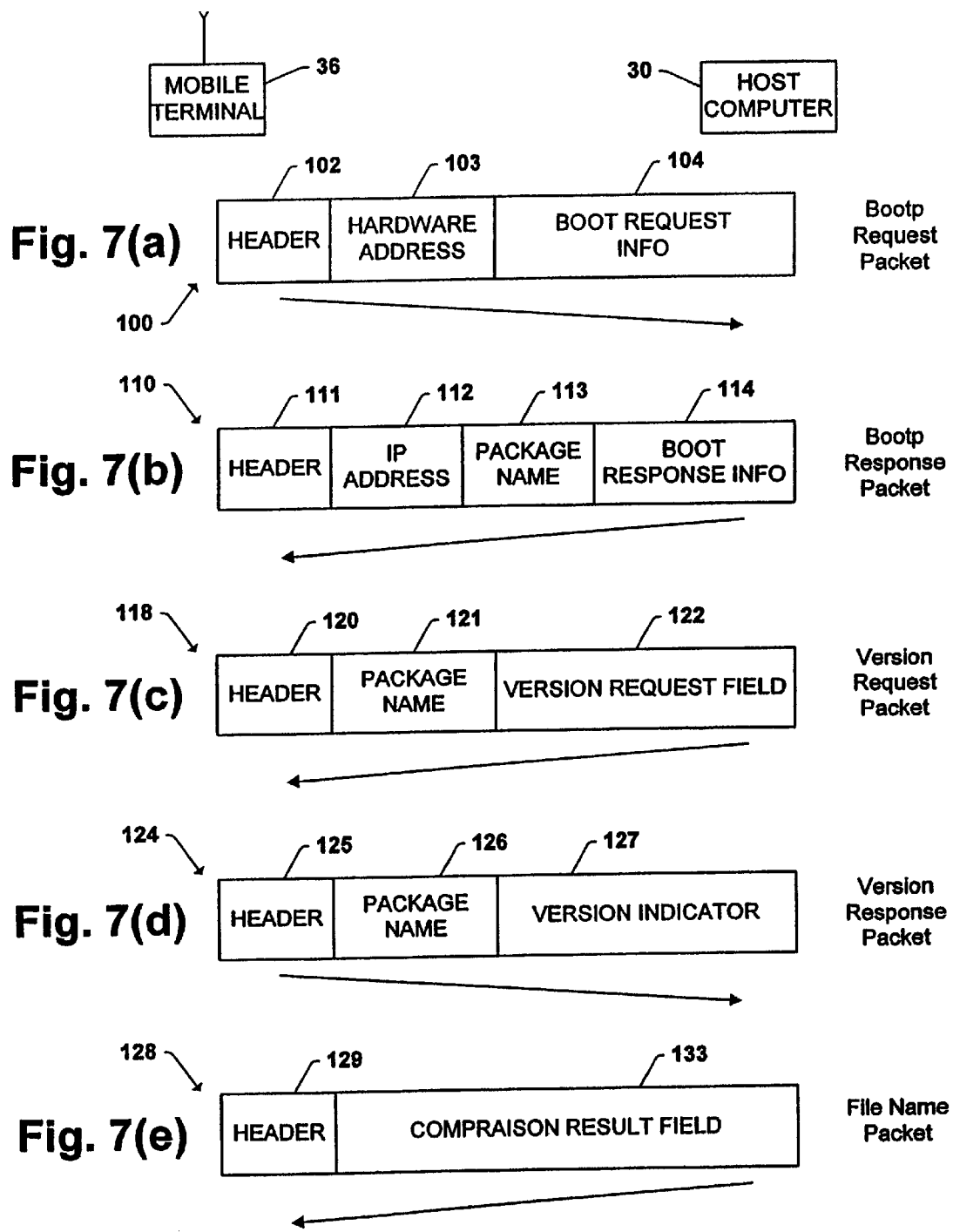

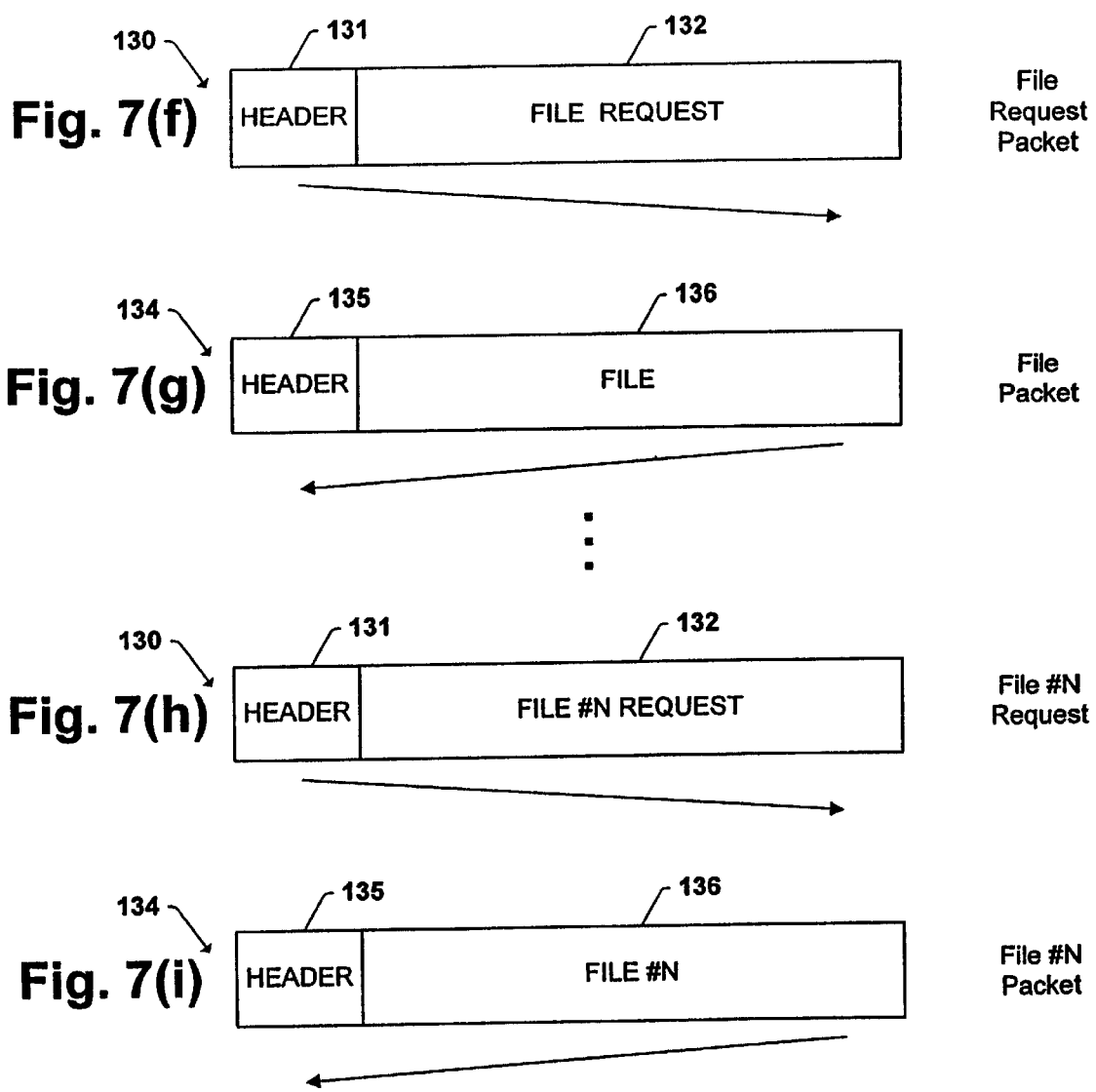

Package Definition Files:

Fig. 13a

| Package Name | Version ID, Req. Memory, Mode | File Name | Mobile Ter. Path | Host Path | Type | ROM/RAM |
|---|---|---|---|---|---|---|

Fig. 13b

| Package A | 6.2, 200KB, replace | filename_A1 | mpath A1 | hpath A1 | ... | ROM |
| | | filename_A2 | mpath A2 | hpath A2 | ... | RAM |
| | | . | . | . | . | . |
| | | filename_An | mpath An | hpath An | ... | ROM |

| Package B | A3, 150KB, fail safe | filename_B1 | mpath B1 | hpath B1 | ... | RAM |
| | | filename_B2 | mpath B2 | hpath B2 | ... | RAM |
| | | . | . | . | . | . |
| | | filename_Bn | mpath Bn | hpath Bn | ... | ROM |

| Package Z | 1.9, 320KB, replace | filename_Z1 | mpath Z1 | hpath Z1 | ... | ROM |
| | | filename_Z2 | mpath Z2 | hpath Z2 | ... | ROM |
| | | . | . | . | . | . |
| | | filename_Zn | mpath Zn | hpath Zn | ... | RAM |

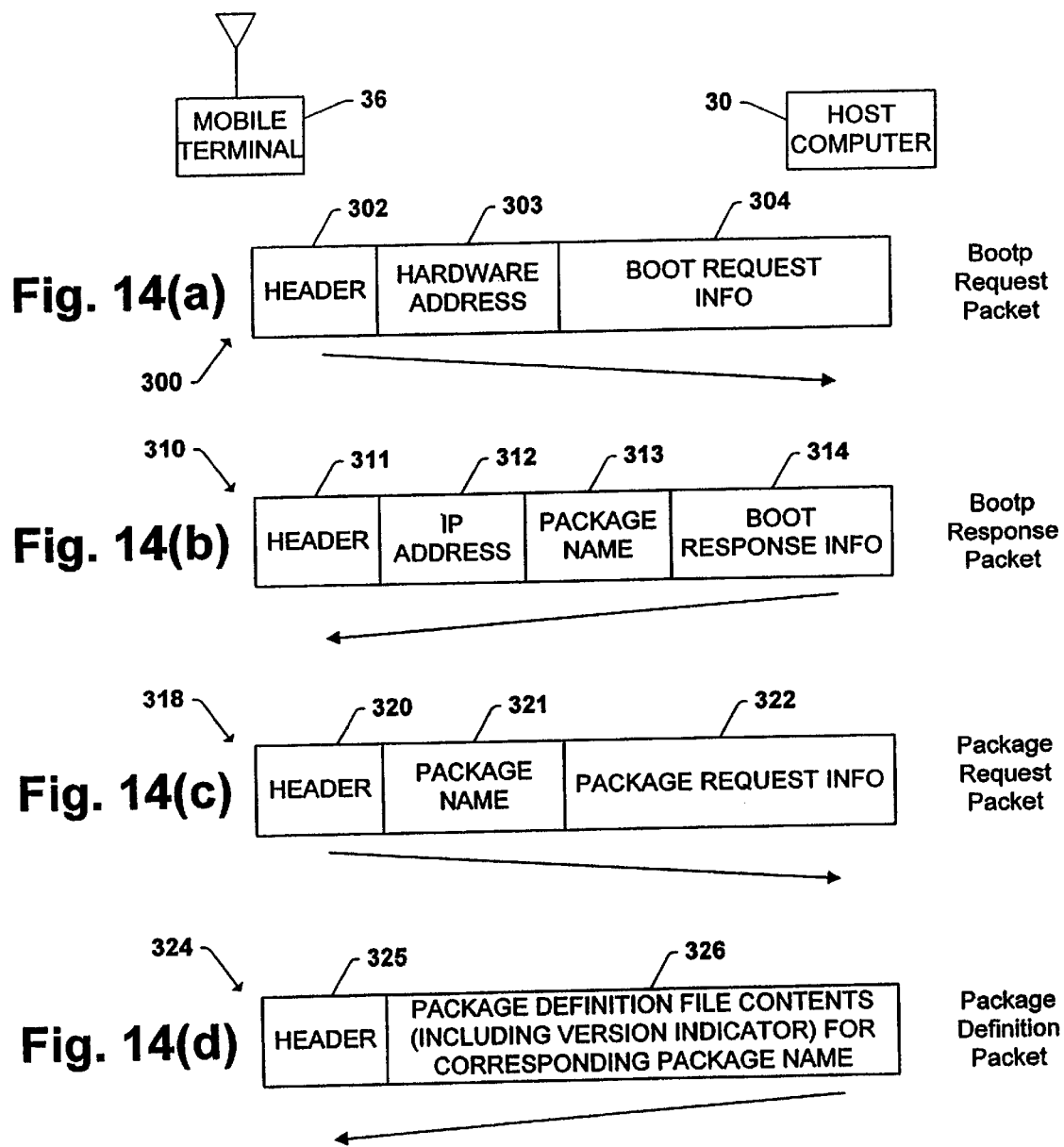

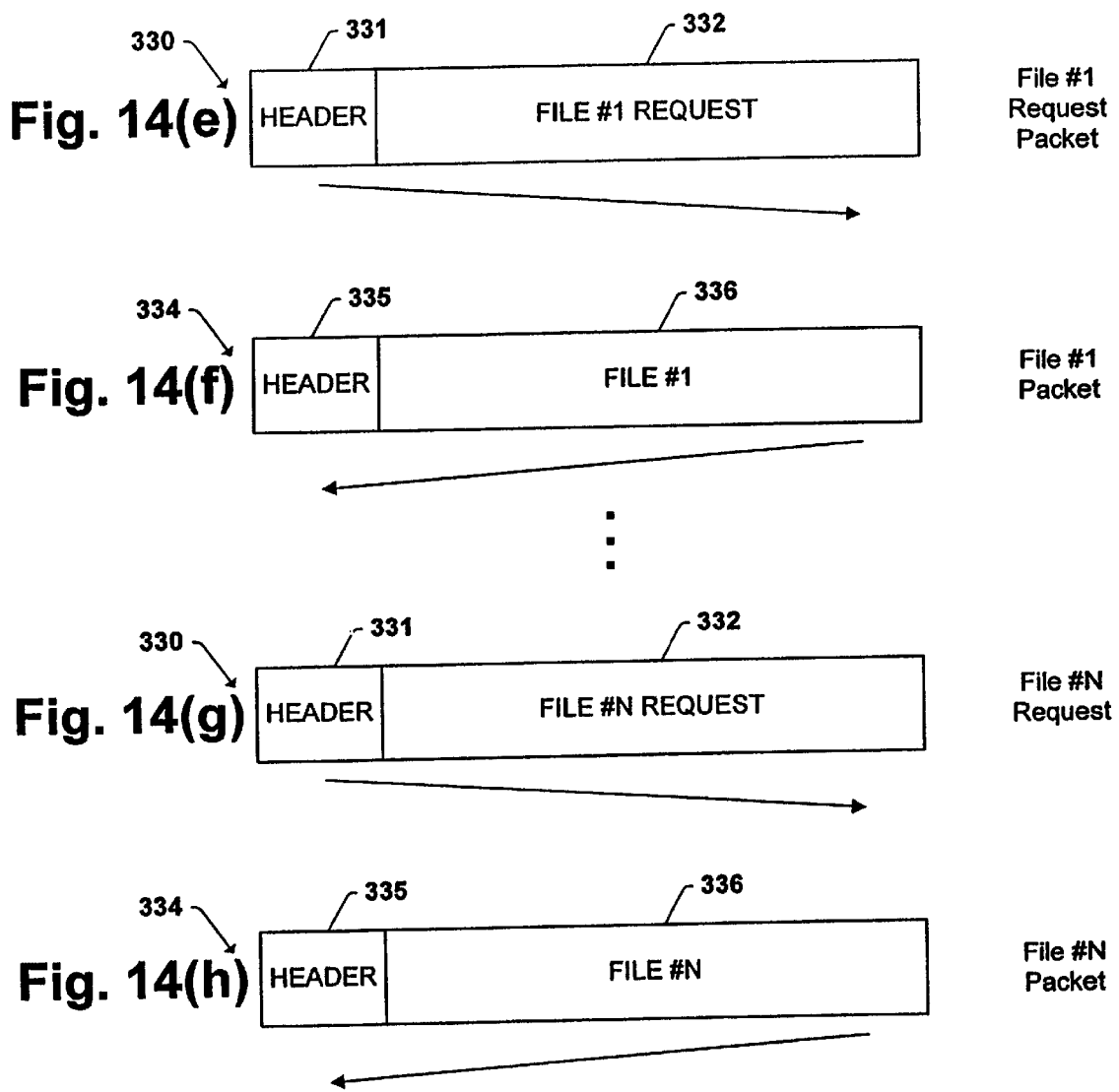

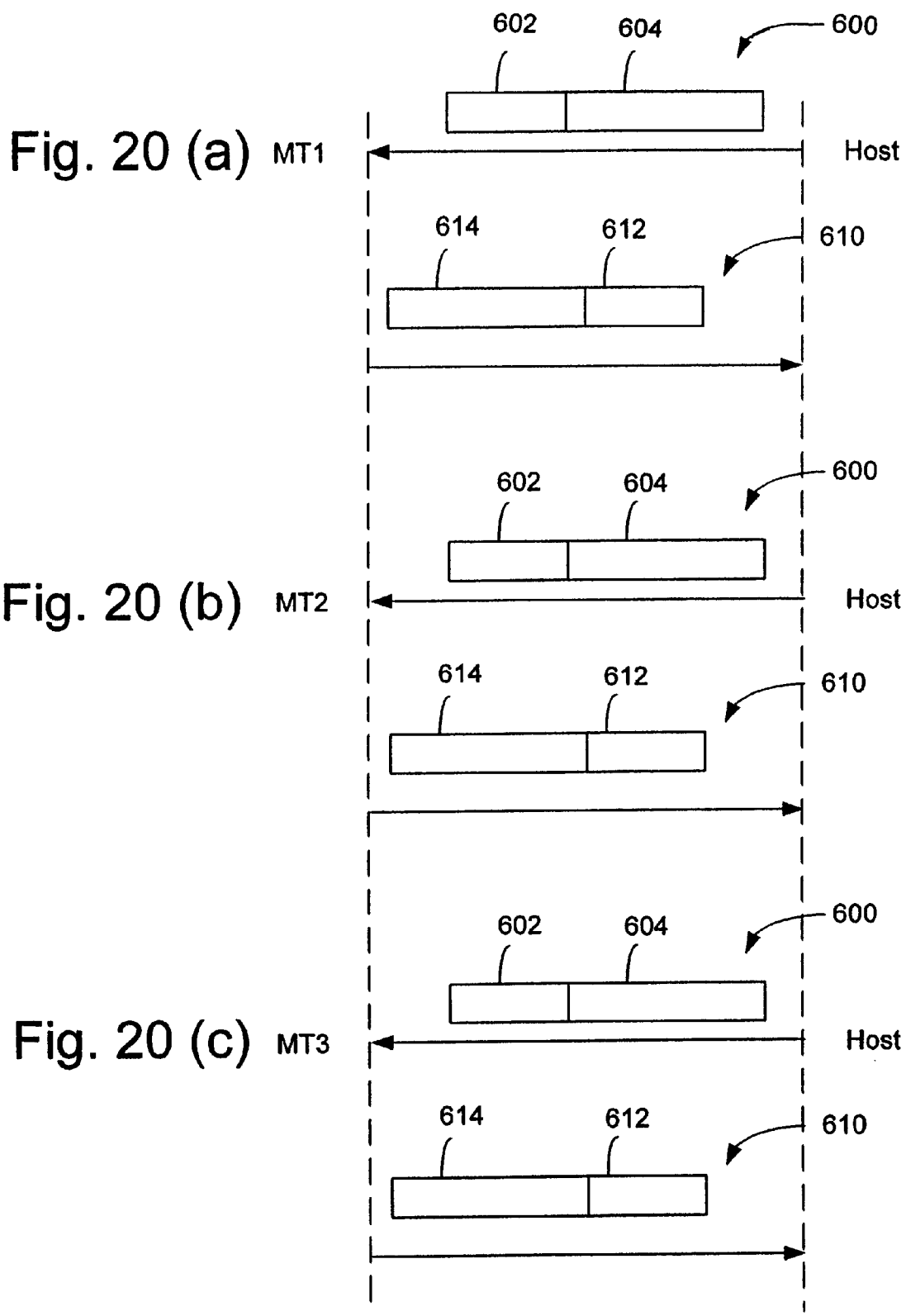

WIRELESS SOFTWARE UPGRADES WITH VERSION CONTROL

CROSS-REFERENCE TO RELATED APPLICATION

This application is a continuation of co-pending, commonly assigned U.S. patent application Ser. No. 09/234,813 filed on Jan. 21, 1999 and entitled "Wireless Software Upgrades with Version Control (now U.S. patent number U.S. Pat. No. 6,308,061 which is a continuation-in-part of co-pending, commonly assigned U.S. patent application Ser. No. 09/208,785, filed on Dec. 10, 1998 and entitled "Wireless Software Upgrades with Version Control" which is a continuation-in-part of co-pending commonly assigned U.S. patent application Ser. No. 09/023,857, filed Feb. 13, 1998 and entitled "Wireless Software Upgrades with Version Control" (now U.S. Pat. No. 6,031,830) which is a continuation of co-pending, commonly assigned U.S. patent application Ser. No. 08/694,637 filed on Aug. 7, 1996 (now U.S. Pat. No. 5,848,064, issued Dec. 8, 1998) and entitled "Wireless Software Upgrades with Version Control".

TECHNICAL FIELD

The present invention relates generally to wireless software upgrades in wireless communication systems. More particularly, the present invention relates to a system and method in which software upgrades are provided wirelessly to mobile devices upon detecting that software currently in the mobile devices is outdated.

BACKGROUND OF THE INVENTION

In recent years, the use of wireless (e.g., cellular) communication systems having mobile devices which wirelessly communicate with a network, such as a local area network (LAN) and a wide area network (WAN), has become widespread. Retail stores and warehouses, for example, may use cellular communications systems to track inventory and replenish stock. The transportation industry may use such systems at large outdoor storage facilities to keep an accurate account of incoming and outgoing shipments. In manufacturing facilities, such systems are useful for tracking parts, completed products, defects, etc.

A typical cellular communication system includes a number of fixed base stations or access points interconnected by a cable medium often referred to as a system backbone. Also included in many cellular communication systems are intermediate base stations which are not directly connected to the system backbone. Intermediate base stations, often referred to as wireless base stations or repeaters, increase the area within which base stations connected to the system backbone can communicate with mobile devices. Unless otherwise indicated, the term "base station" will hereinafter refer to both base stations hardwired to the network and wireless base stations.

Associated with each base station is a geographic cell. A cell is a geographic area in which a base station has sufficient signal strength to transmit data to and receive data from a mobile device with an acceptable error rate. Typically, base stations will be positioned along the backbone such that the combined cell area coverage from each base station provides full coverage of a building or site. Thus, mobile devices roaming within such an area can maintain continuous communication with a host computer or other device situated along the system backbone.

Each mobile device roaming within a building or site is typically preloaded with software to provide both application level and operational level instructional code (referred to generally herein as "operating software"). The mobile device includes one or more processors which execute the operating software, thereby allowing the mobile device to carry out its appropriate functions. The software is stored in memory in the mobile device and may be executed at any time depending on the particular operational needs of the mobile device.

Due to changing market needs and advancements in technology, for example, it often happens that the software which is preloaded into a mobile device becomes outdated prior to the time the mobile hardware device becomes obsolete. Therefore, a number of methods for upgrading the operating software stored in a mobile device have been developed.

One known method for updating software in a mobile device is by physically connecting the mobile device to a computer capable of upgrading the software. In order to upgrade software using this technique it is typically necessary to employ one or more service technicians to assist in connecting the mobile device to the computer with a cable or the like and executing the software upgrade routine. This results in down time for the mobile device and related service costs.

Another known method of updating the operating software in a mobile device involves wirelessly transmitting software upgrades to the mobile device. When executing a wireless software upgrade, a mobile device transmits a request to the host computer (via a base station) requesting that the host computer transfer the upgraded software. In order to ensure a mobile device has the most recent version of the operating software, each program within the operating software must be downloaded periodically from the host computer and stored in the mobile device. Unfortunately, the periodic transfer of upgraded operating software to the mobile device can be extremely time consuming and becomes increasingly more time consuming as the number of mobile devices within the system increases. Furthermore, since there is no way to determine if software has been changed since the previous time the mobile device software has been upgraded, time is frequently wasted updating the mobile device operating software with the same version of software which already exists in the mobile device.

In view of the aforementioned shortcomings associated with existing systems and techniques for upgrading mobile device operating software, there is a strong need in the art for a system and method which does not require significant down time or service costs. Moreover, there is a strong need in the art for a system and method which avoids the inefficiencies associated with conventional wireless techniques for upgrading the mobile device operating software.

SUMMARY OF THE INVENTION

A wireless communication system and method is provided in which software upgrades are wirelessly transmitted to a mobile device based on a determination of whether such an upgrade is necessary.

According to one embodiment, a wireless communication system includes a system backbone, a host computer coupled to the system backbone, at least one base station coupled to the system backbone, the at least one base station including a base station transceiver for communicating wirelessly with mobile devices within the system, and at least one mobile device having a mobile device transceiver for communicating wirelessly with the host computer on the system backbone via the at least one base station. The at least one mobile device includes a software update schedule table for providing one or more times at which the mobile device is to inquire and obtain available software upgrades. By providing the at least one mobile device with a software update schedule table, the at least one mobile device can be configured to obtain wireless software upgrades at predetermined times. For example, such predetermined times may correspond to times when the host computer is at a low-load level. In this manner, the amount of activity the host computer is subjected to at higher activity or peak times is reduced.

Entries in the software update schedule table may be made manually through a keypad or other user input associate with the at least one mobile device or wirelessly through communications received from the host computer. By providing for wireless updates of the software update schedule table, the host computer can, for example, schedule updates with multiple mobile devices after a known update of the software in the host computer or FTP server is completed. Preferably, wireless updates provided by the host computer are such as to schedule each mobile device to correspond with the host computer and/or FTP server in sequential, non-overlapping time intervals during low-load periods so as to minimize wireless interference and contention in obtaining access to the upgrades software files.

In the event the mobile device is in a sleep mode during a scheduled time for conducting an inquiry as to whether any upgrades of operating software is available, a processor of the mobile device is configured to temporarily place the mobile device in a fully operation mode until a process of determining and obtaining any upgrades operating software is complete. In this manner, updates may be scheduled at low activity periods without the need for an operator to physically activate the mobile device to a full power state.

In accordance with one particular aspect of the invention, a wireless communication system includes a system backbone, a host computer coupled to the system backbone, at least one base station coupled to the system backbone, the at least one base station including a base station transceiver for communicating wirelessly with mobile devices within the system, and at least one mobile device having a mobile device transceiver for communicating wirelessly with the host computer on the system backbone via the at least one base station. A method of operation includes the steps of maintaining in the at least one mobile device a software update schedule table indicating at least one time at which the at least one mobile device is to inquire as to whether an upgrade of operating software is available, determining in the at least one mobile device whether the software update schedule table indicates it is time to inquire as to whether an upgrade of operating software is available, in the event the at least one mobile device determines from the software update schedule table that it is time to initiate obtaining the upgrade of operating software, the at least one mobile device determining whether a version of the operating software stored in the at least one mobile device is a current version of the operating software, and wirelessly updating the operating software stored in the at least one mobile device if it is determined that the operating software stored in the at least one mobile device is not the current version.

In accordance with another particular aspect of the invention, a wireless communication system is provided. The wireless communication system includes a system backbone, a host computer coupled to the system backbone, at least one base station coupled to the system backbone, the at least one base station including a base station transceiver for communicating wirelessly with mobile devices within the system, at least one mobile device having a mobile device transceiver for communicating wirelessly with the host computer on the system backbone via the at least one base station, and wherein the at least one mobile device includes a software update schedule table providing at least one time at which the at least one mobile device is to determine whether to selectively update mobile device operating software with at least one of the host computer and an FTP server coupled to the system backbone based on an initial comparison in accordance with a predetermined criteria indicative of whether updating of the mobile device operating software is appropriate.

In accordance with still another aspect of the invention, a mobile device is provided. The mobile device includes a processor, a memory coupled to the processor, a transceiver for wirelessly transmitting and receiving information, and a software update schedule table stored in the memory, the software update schedule table providing at least one entry indicating a time at which the at least one mobile device is to determine whether to selectively update mobile device operating software with at least one of a host computer and an FTP server coupled to a system backbone based on an initial comparison in accordance with a predetermined criteria indicative of whether updating of the mobile device operating software is appropriate.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 4 illustrates the contents of a bootptab table stored in memory within the host computer, the bootptab table including the internet protocol (IP) addresses and boot file package names associated with each mobile terminal in the system in accordance with the present invention;

FIG. 5a illustrates the general format of the package definition files stored in memory within the host computer, wherein each package definition file includes information identifying operating software to be used by mobile terminals within the system and information indicating the version of the operating software in accordance with the present invention;

FIGS. 5b, 5c and 5d represent exemplary package definition files in accordance with the present invention;

FIGS. 7(a)–7(e) represent schematically a process in which information packets are exchanged between a mobile terminal and the host computer (via a base station) in order to identify and transfer upgraded operating software in accordance with an exemplary embodiment of the present invention;

FIGS. 7(f)–7(i) represent schematically a process in which information packets are exchanged between a mobile terminal and the FTP server (via a base station) in order to download updated operating software in accordance with an exemplary embodiment of the present invention;

FIG. 13a illustrates the general format of the package definition files stored in memory within the host computer, wherein each package definition file includes information identifying operating software to be used by mobile terminals within the system and information indicating the version of the operating software in accordance with an alternative embodiment of the present invention;

FIGS. 13b, 13c and 13d represent exemplary package definition files in accordance with an alternative embodiment of the present invention;

FIGS. 14(a)–14(h) represent schematically a process in which information packets are exchanged between a mobile terminal and the host computer (via a base station) in order to identify and transfer upgraded operating software in accordance with an alternative embodiment of the present invention;

DESCRIPTION OF THE PREFERRED EMBODIMENTS

Figure 1:
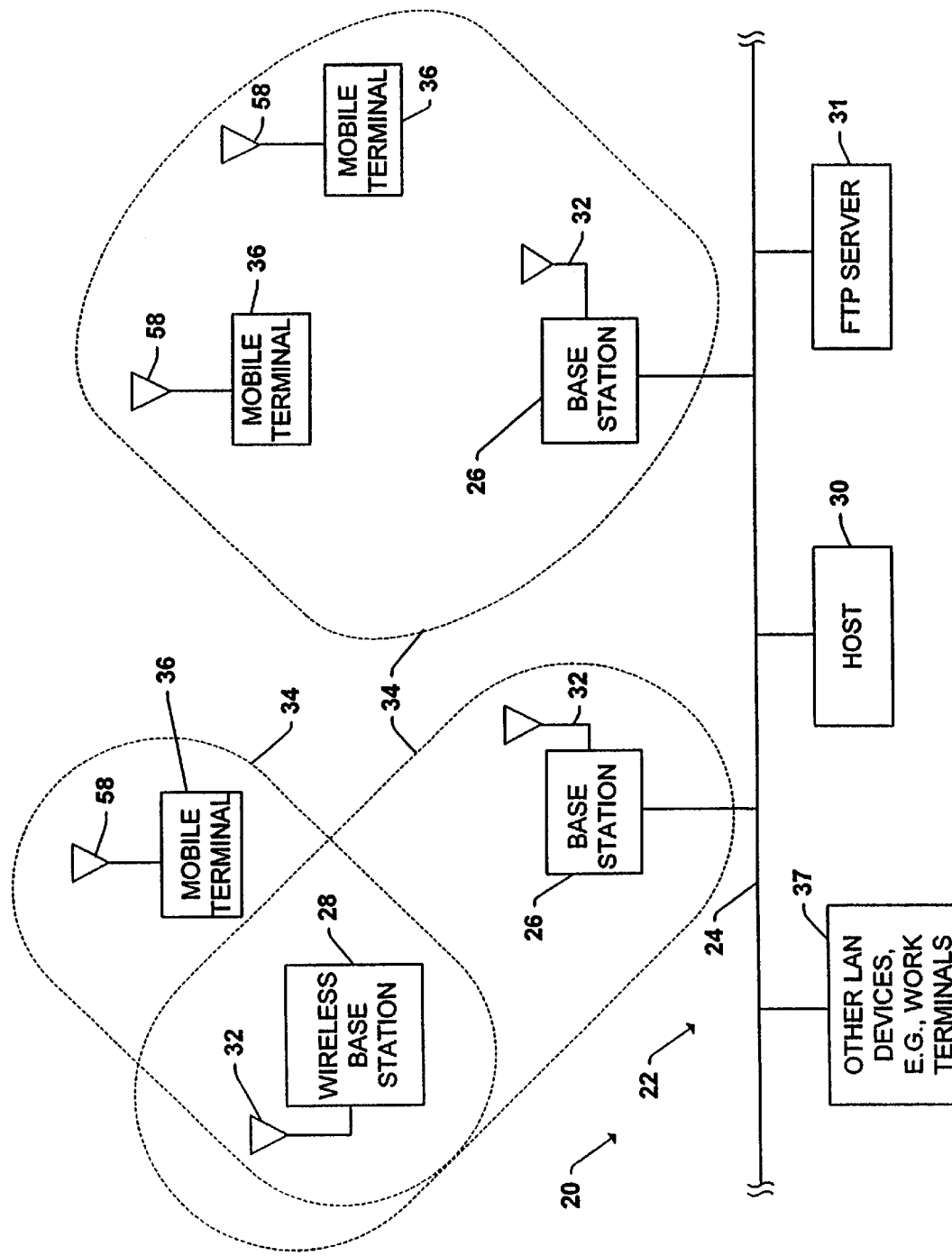
FIG. 1 is a block diagram of a wireless communication system in accordance with an exemplary embodiment of the present invention.

The present invention will now be described with reference to the drawings wherein like reference numerals are used to refer to like elements throughout.

As is mentioned above, the present invention relates to wireless (e.g., cellular) communication systems which include mobile devices that can roam from cell to cell. Such mobile devices can be data terminals, telephones, pagers, etc. In the exemplary embodiment described hereinafter, each mobile device is a mobile data terminal (hereinafter "mobile terminal") used to communicate data such as inventory or the like within a cellular system. However, it is recognized that the invention contemplates other types of mobile devices and is not intended to be limited to systems utilizing mobile terminals.

Referring now to FIG. 1, a cellular communication system 20 is shown in accordance with the exemplary embodiment of the present invention. The cellular communication system 20 includes a network 22 having a system backbone 24. The system backbone 24 may be a hardwired data communication path made of twisted pair cable, shielded coaxial cable or fiber optic cable, for example, or may be wireless in nature. Connected to the system backbone 24 are several base stations 26. Each base station 26 serves as an entrance point through which wireless communications may occur with the system backbone 24. Additionally, in order to expand the effective communication range of the base stations 26, one or more wireless base stations 28 are also included in the cellular communication system 20. As is conventional, each wireless base station 28 associates itself, typically by registration, with another base station, whether hardwired or wireless, such that a link is formed between itself and other devices situated on the system backbone 24. For example, in the system 20 shown in FIG. 1 a wireless base station 28 associates itself with one of the base stations 26 connected to the system backbone 24 so that a communication link is formed between the wireless base station 28 and a host computer 30 also coupled to the system backbone 24. All communications between the wireless base station 28 and a device on the system backbone 24 are made possible by the other base stations on the link which are configured to relay communications therebetween.

Each base station 26, 28 is capable of wirelessly communicating with other devices in the system 20 via an antenna 32. A geographic cell 34 associated with each base station 26, 28 defines a region of coverage in which successful wireless communication may occur. Depending on the type of antenna 32 selected and the output power of the respective base station, the cell 34 may take one of several different forms and sizes. For example, FIG. 1 depicts the base stations 26, 28 utilizing an omni-directional antenna wherein a generally spherical cell area of coverage is obtained. However, a directed yagi-type antenna or other form of antenna could also be used as will be readily appreciated.

The cellular communication system 20 also includes one or more mobile terminals 36. Each mobile terminal 36 communicates with devices on the system backbone 24 via a selected base station 26, 28 and/or with other mobile terminals 36. Upon roaming from one cell 34 to another, the mobile terminal 36 is configured to associate itself with a new base station 26, 28 according to conventional techniques.

In addition to the host computer 30, a file transfer protocol (FTP) server is also coupled to the system backbone 24. While the present embodiment depicts an FTP server, it will be appreciated that a trivial file transfer protocol (TFTP) server could alternatively be used. For purposes of this invention and accompanying claims, both the FTP server and TFTP server will be generally referred to as FTP server 31. As will be described in more detail below, the FTP server 31 maintains the most current versions of all mobile terminal operating software. Accordingly, when the mobile terminal 36 needs to update its operating software, the mobile terminal 36 downloads the latest software from the FTP server 31. While in the present embodiment the FTP server 31 is depicted to be independent of the host computer 30 it will be appreciated that the FTP 31 server could be embedded within the host computer 30. Alternatively, the host computer 30 could be programmed to perform the functions of the FTP server 31 in which case the FTP server 31 would not be included in the cellular communication system 20. Furthermore, the cellular communication system 20 may include one or more other devices 37 connected to the system backbone 24. Such devices 37 may include work terminals, printers, cash registers, etc.

In the exemplary embodiment, the host computer 30 is responsible for supporting the network activities of the mobile terminals 36 within the system 20. As part of such function, the host computer 30 is responsible for determining whether the mobile terminals 36 have the most current versions of software and, if updating is needed, indicating to the mobile terminals 36 which operating software needs to be updated. When a mobile terminal 36 within the system initially powers up (via an on/off switch for example) or is reset, the mobile terminal 36 goes through an initialization, or boot-up routine. Such routine includes communicating with the host computer 30 via a selected base station 26 in order that the host computer 30 provides the mobile terminal 36 with its internet protocol (IP) address as is conventional. In addition, however, just following the boot up routine, or at any time thereafter, the host computer 30 requests from the mobile terminal indica which identifies which version of operating software the mobile terminal is running. The host computer 30 then compares the version of operating software stored within the mobile terminal 36 with the latest version of software known to be available in the FTP server 31. If the mobile terminal 36 has a different version of operating software stored as compared to the version currently available in the FTP server 31, it is assumed that the operating software in the FTP server 31 has been upgraded since the last time the mobile terminal 36 has logged on. Consequently, host computer 31 transmits a request to the mobile terminal 36 requesting the mobile terminal 36 to have its operating software updated. Upon receiving the request, the mobile terminal 36 initiates an exchange with the FTP server 31 to download the latest version of operating software available. In the event the version of the operating software stored in the FTP server 31 is the same version as that which is currently stored in the mobile terminal 36, the host computer 30 does not request the mobile terminal 36 to update its operating software. In this manner, needless downloading of files is avoided.

Accordingly, when a system operator wishes to change the operating software of one or more mobile terminals 36 within the system 20, the system operator loads the upgraded software into the FTP server 31 as discussed below. Included with each version of operating software is a unique identifier indicative of the particular version. The system administrator also updates the host computer to correspondingly reflect the modifications to the current software loaded in the FTP server. In particular, the system administrator updates the host computer with sufficient information to communicate those fields provided in the package definition files discussed below with respect to FIGS. 5a–5d. Then, when a mobile terminal 36 is next queried by the host computer regarding which version of operating software is being run, the mobile terminal 36 will be informed by the host computer 30 that the FTP server 31 has an upgraded version causing the mobile terminal 36 to request that the upgraded operating software be downloaded from the FTP server 31.

Figure 2:
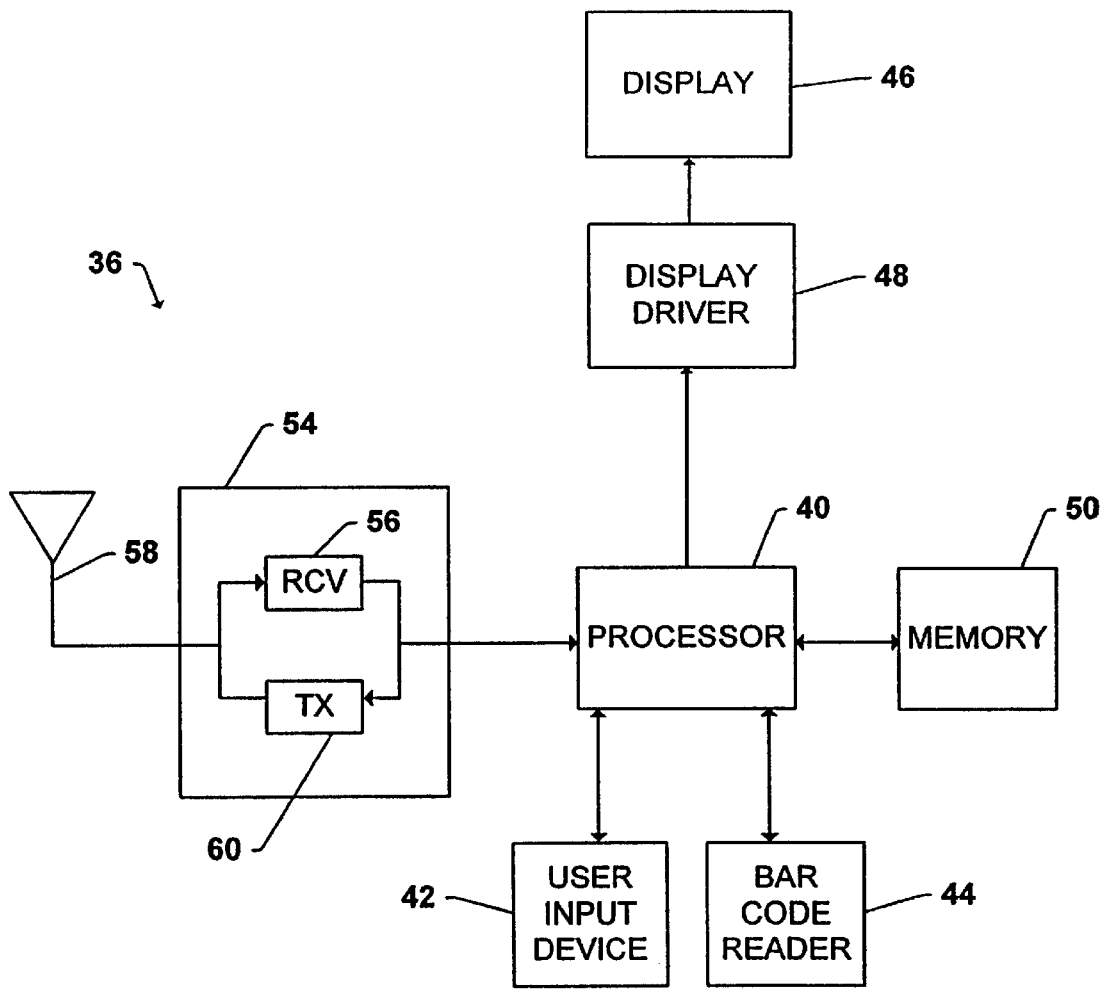
FIG. 2 is a block diagram of a mobile terminal in accordance with the present invention.

FIG. 2 is a block diagram representing the basic structure of each of the mobile terminals according to the exemplary embodiment. Each mobile terminal 36 includes a processor 40 which can be programmed to control and to operate the various components within the mobile terminal 36 in order to carry out the various functions described herein. The processor 40 may be, for example, an Intel 80486 or similar type microprocessor. The processor 40 is coupled to a user input device 42 which allows a user to input data to be communicated to the system backbone 24 such as inventory data, patient information, etc. This information may be sent to the host computer 30 which serves as a central data location, for example, or to a cash register connected to the system backbone 24, as another example, for providing price information. Furthermore, the input device 42 allows a user to input a software availability request as is discussed in more detail below. The input device 42 can include such items as a keypad, touch sensitive display, etc. The mobile terminal 36 also may include a bar code reader 44 coupled to the processor 40 for providing another form of data input. A display 46 is also connected to and controlled by the processor 40 via a display driver circuit 48. The display 46 serves as a means for displaying information stored within the mobile terminal 36 and/or received over the system backbone 24 via a base station 26. The display 46 can be a flat panel liquid crystal display with alphanumeric capabilities, for example, or any other type of display as will be appreciated.

Each mobile terminal 36 also includes a memory 50 for storing program code executed by the processor 40 for carrying out the functions described herein. In particular, the memory 50 includes a non-volatile portion (e.g., an EEPROM) for storing mobile terminal operating software which is executed by the processor 40 in order to carry out the desired operations of the mobile terminal 36. The particular operating software is not critical to the invention and it will suffice to say that such operating software typically will be related to the application of the mobile terminal, e.g., communication protocols, utility programs such as for inventory control, patient care, etc. As noted above, however, it may be desirable at times to upgrade such operating software with revised and/or completely different software. Thus, the memory 50 also has stored therein code which is executed by the processor 40 in order to perform the functions described below in relation to FIGS. 7(a)–7(i) and FIGS. 15(a)–15(b) for downloading upgraded software from the FTP server 31. The actual code for performing such functions can be easily programmed by a person having ordinary skill in the art of computer programming in any of a number of conventional programming languages based on the disclosure herein. Consequently, further detail as to the particular code itself has been omitted for sake of brevity. As is described below in more detail in connection with FIGS. 7(a)–7(i) and FIGS. 15(a)–15(b), the processor 40 also stores in the memory 50 information relating to the version of mobile terminal operating software stored therein. The processor 40 is programmed to download operating software from the FTP server 31 if the update indicia received from the host computer 30 indicates that the FTP server 31 has stored therein more current versions of the operating software. If the processor 40 does download current versions of operating software, the processor 40, in one embodiment, goes on to replace the previous operating software which was stored in the memory 50 with the upgraded operating software obtained from the FTP server 31.

Each mobile terminal 36 also includes its own RF transceiver section 54 connected to the processor 40. The RF transceiver section 54 includes an RF receiver 56 which receives RF transmissions from a base station 26, 28 via an antenna 58 and demodulates the signal to obtain the digital information modulated therein. An example of a suitable RF receiver 56 for use in the mobile terminal 36 (as well as the base stations 26, 28) is the Model 025 Direct Sequence Spread Spectrum Radio Module, which is commercially available from Aironet Wireless Communications, Inc. of Akron, Ohio.

The RF transceiver section 54 also includes an RF transmitter 60. In the event the mobile terminal 36 is to transmit information to the backbone 24 in response to an operator input at input device 42 or as part of its boot-up routine, for example, the processor 40 forms digital information packets which are then delivered to the RF transmitter 60. According to conventional techniques, the RF transmitter 60 transmits an RF signal with the information packets modulated thereon via the antenna 58 to the base station 26 with which the mobile terminal 26 is registered.

Figure 3A:
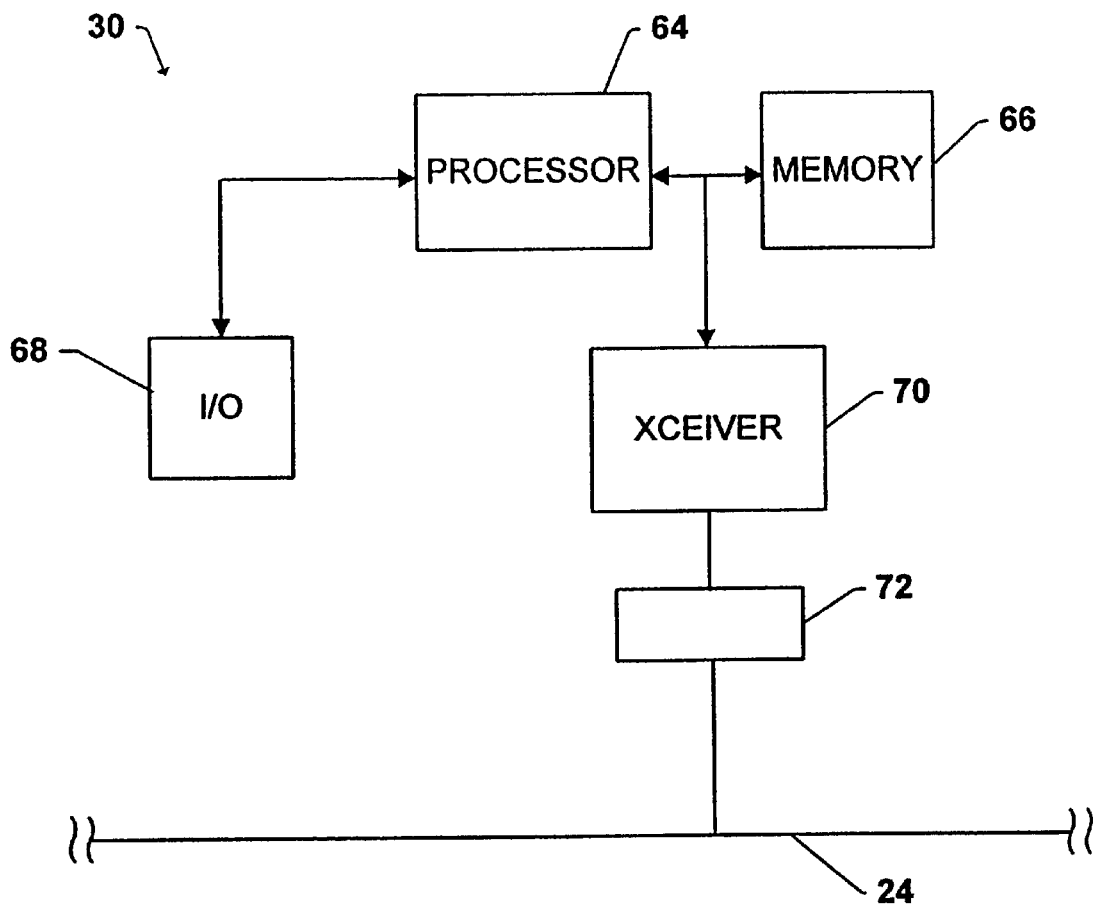
FIG. 3a is a block diagram of a host computer in accordance with the present invention.

Referring now to FIG. 3a, a block diagram of the host computer 30 is provided. The host computer 30 may be a personal computer, for example, and includes its own processor 64 (e.g., an Intel 80486DX or Pentium® processor). Coupled to the processor 64 is a memory 66 for storing code for controlling the operation of the host computer 30 in accordance with the description provided herein. Again, based on the description provided herein, a person having ordinary skill in the art of computer networks and system administration will be able to set up the host computer 30 to support the various operations described herein. Accordingly, additional detail is omitted. The memory 66 may include, but certainly is not limited to, a hard disk storage medium.

The processor 64 is coupled to an input/output (I/O) port or device 68 as shown in FIG. 3. The I/O device 68 may include a floppy disk drive or the like which enables a system operator to transfer upgraded mobile terminal operating software into the memory 66 using conventional file transfer techniques. The processor 64 is coupled to the system backbone 24 by way of a network adaptor transceiver 70 and connector 72 as is conventional. The host computer 30 is able to transmit and receive information over the system backbone 24 via the transceiver 70 and connector 72.

Figure 3B:
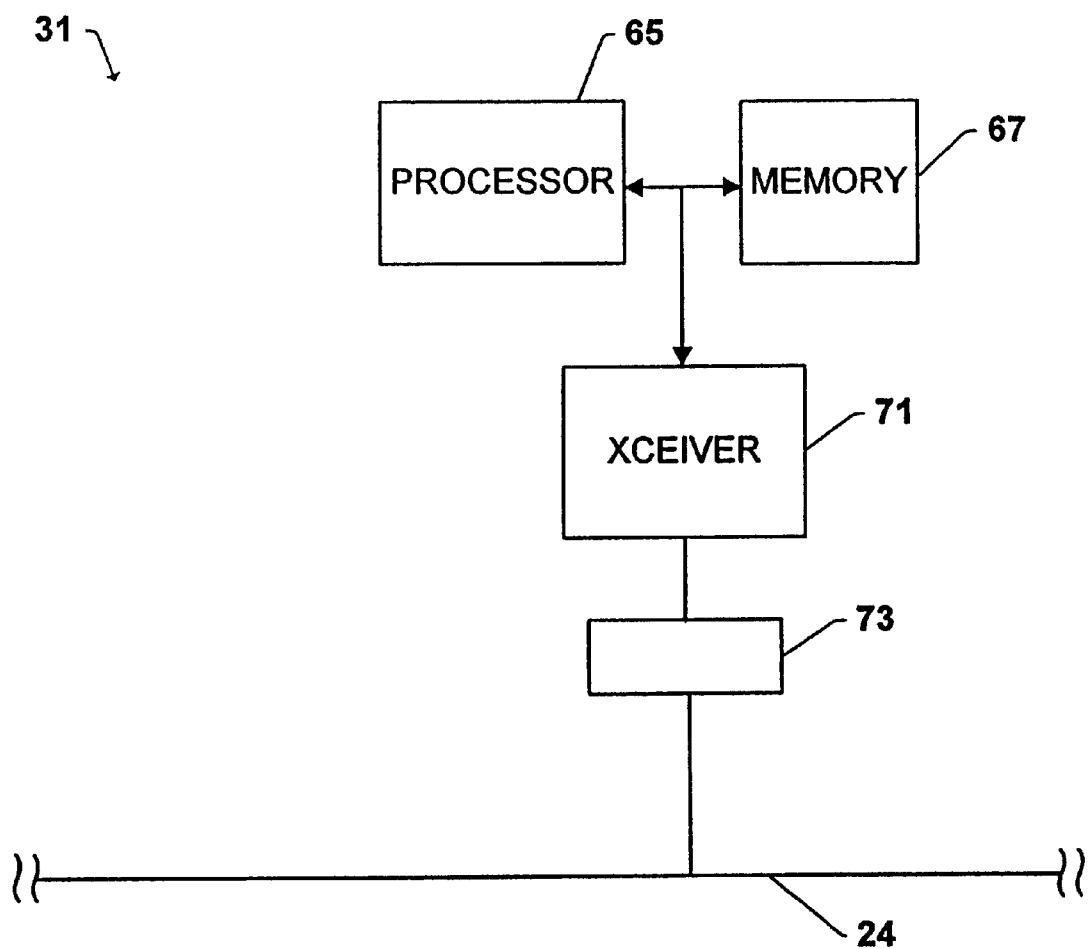
FIG. 3b is a block diagram of an FTP server in accordance with the present invention.

Referring now to FIG. 3b, a block diagram of the FTP server 31 is provided. Similar to the host computer 30, the FTP server 31 includes a processor 65 coupled to the system backbone 24 through a transceiver 71 and connector 73. A memory 67 is coupled to the processor 65. As will be described in more detail below, the memory 67 is updated with the latest version of software for each of the mobile terminals 36. For example, a system administrator may install revised versions of software in the memory 67.

As shown in FIG. 4, the memory 66 of the host computer 30 has stored therein a bootptab table. Briefly, the bootptab table is maintained by the processor 64 of the host computer 30 and is arranged to include an entry for each mobile terminal within the system 20. As shown in FIG. 4, each entry includes the hardware address of the mobile terminal and the corresponding internet protocol (IP) address assigned to the mobile terminal. In addition, each entry includes a boot file in the form of a package name which identifies the particular package of operating software which is to be utilized by the corresponding mobile terminal 36.

Also stored in the memory 66 is a collection of package definition files as represented in FIGS. 5a–5d. Specifically, the memory 66 includes a different package definition file for each particular package name included in the bootptab table shown in FIG. 4. FIG. 5a illustrates generally the various information fields included in each package definition file, whereas FIGS. 5b–5d provide illustrative examples of different package definition files. Each package definition file includes a version identifier (e.g., 6.2, A3, 1.9, etc.) which is a unique identifier of the particular version of the operating software associated with that particular package name. Each time one or more software files included in the operating software associated with a given package name is added, deleted or modified within the FTP server 31, the version identifier stored in the package definition file for that package name is modified to a new, unique identifier. The new identifier stored in the package definition files as discussed below is manually entered into the host computer 30 by a system administrator or the like, for example.

Each package definition file also includes an indication of the total memory occupied by the operating software associated with the package name (e.g., 200 Kbytes, 150 Kbytes, etc.). In addition, each package definition file includes an indicator which indicates whether the operating software which is downloaded from the FTP server 31 to the mobile terminal is to be downloaded in a "replace" or "fail safe" mode as is discussed in more detail below. Each package definition file also includes a list of filenames included in the operating software associated with the package name. As will be appreciated, such file names represent the files that are utilized by the mobile terminal 36 to carry out its various operations. The actual contents of such files are conventional and are not germane to the invention. If, however, any of these files are deleted, added, or modified as described above, the version indicator is updated in the package definition file by the communication received from the FTP server 31 or directly by input from the system administrator.

Furthermore, each package definition file includes the mobile terminal path (e.g., the directory path) identifying where in the mobile terminal memory 50 the respective files represented by the file names are to be stored. Each package definition file also includes an FTP server path (e.g., the directory path) indicating where in the FTP server memory 67 the respective files are stored. The package definition files also include information relating to the file type for each of the file names identified in the package definition, such type information being useful for facilitating downloading of the file as is conventional. For example, the type information may indicate that the file is currently stored in a compressed mode and needs to be decompressed upon receipt, etc. Finally, the package definition files include information relating to whether each of the files represented by the file names is to be stored in read only memory (ROM) or random access memory (RAM) in the mobile terminal 36.

Each time a system administrator updates any portion of the operating software stored in the memory 67, the system administrator also is responsible for assigning a new version identifier in the corresponding package definition file. For example, file names may be added or deleted from a package. Alternatively, one or more files may be modified. In either case, the operating software represents a new version. Once updated, the system administrator also updates the host computer 30 with sufficient information to produce for the mobile terminals 36 the package definition files discussed above with respect to FIGS. 5a–5d.

Figure 6:
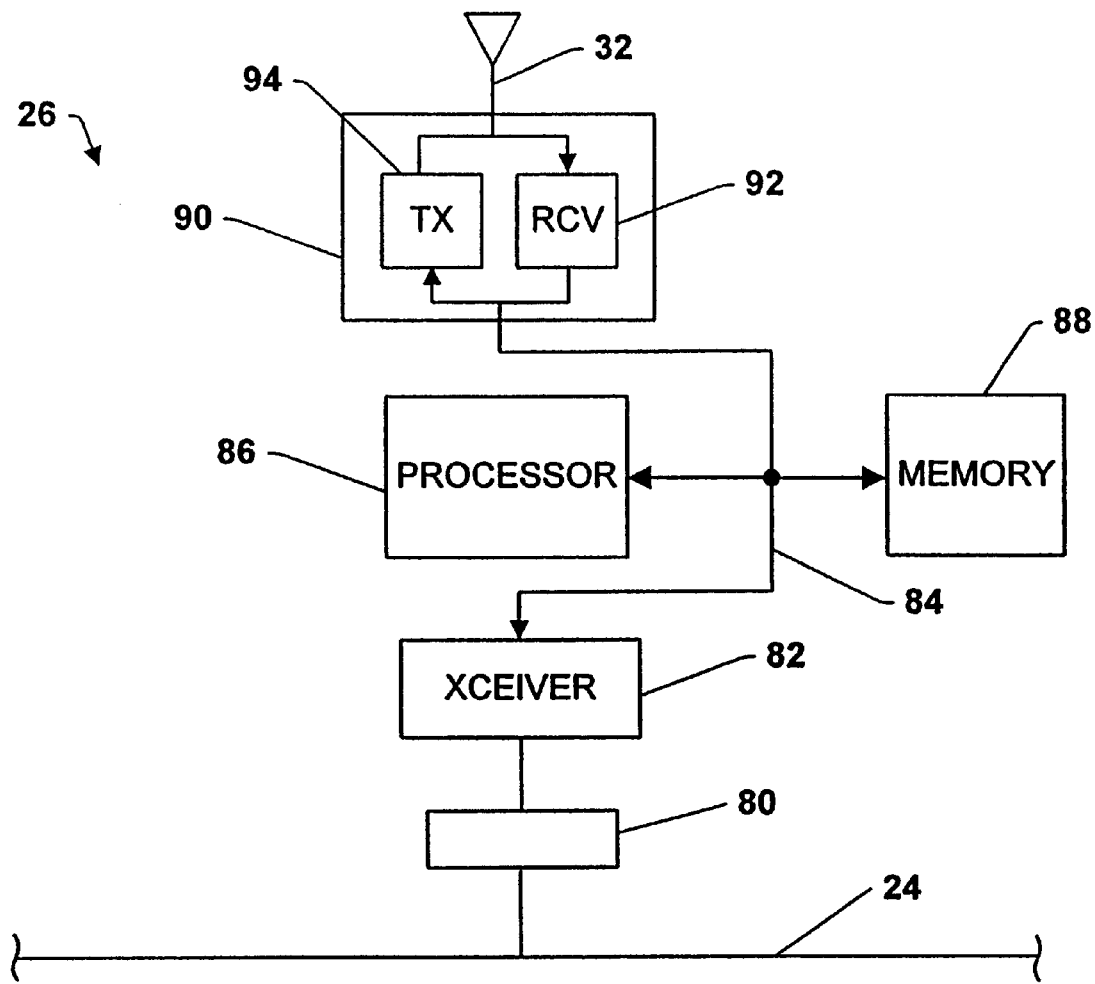
FIG. 6 is a block diagram of a base station in accordance with the present invention.

Referring now to FIG. 6, a block diagram representative of each base station 26 is shown. Each base station 26 is connected to the system backbone 24 via a connector 80 such as a DB-9 or RJ-45 connector. The connector 80 is connected to the system backbone 24 at one end and to a network adapter transceiver 82 included in the base station 26 at the other end. The network adapter transceiver 82 is configured according to conventional network adapter transceiver techniques to allow the base station 26 to communicate over the system backbone 24. The network adapter transceiver 82 is also connected to an internal bus 84 included within the base station 26. The base station 26 further includes a processor 86 connected to the bus 84 for controlling and carrying out the operations of the base station 26. The processor 86 may include any of a variety of different microprocessors, such as the Motorola 68360 (25 MHz) or Intel 80386 microprocessors, for example.

The base station 26 also includes a memory 88 connected to the bus 84. The memory 88 stores program code executed by the processor 86 to control the other elements within the base station 26 to carry out the functions referred to herein. The memory 88 also serves to buffer information such as information received over the system backbone 24 or those transmitted to or received from the mobile terminals 36. Also connected to the bus 24 is an RF transceiver section 90 included in the base station 26. The RF transceiver section 90 includes the aforementioned antenna 32 for receiving radio signals from and transmitting radio signals to mobile terminals 36 within the cell area 34 of the base station 26. Information transmitted from a mobile terminal 36 to the base station 26 is received via the antenna 32 and is processed by an RF receiver 92 which demodulates and decodes the signal and converts the information to a digital signal. The processor 86 in the base station 26 then processes the information according to conventional techniques and stores the information in the memory 88 until such time as the base station 26 is able to transmit the information to its intended destination on the system backbone 24 (e.g., the host computer 30) via the network adapter transceiver 82 and connector 80.

Information which is transmitted to the base station 26 via the system backbone 24 (e.g., from the host computer 30) for transmission to a mobile terminal 36 is received by the network transceiver 82. The processor 86 controls an RF transmitter 94 included in the RF transceiver section 90, the RF transmitter 94 also being connected to the bus 84. The processor 86 causes the RF transmitter 94 to modulate an RF signal using spread spectrum techniques, for example, which in turn carries the information to the appropriate mobile terminal 36. Exemplary hardware for carrying out the above-described basic functions of transmitting and receiving data between the system backbone 24 and one or more mobile terminals 36 is found in the ARLAN 631® Token Ring Access Point, which is commercially available from Aironet Wireless Communications, Inc., Akron, Ohio.

FIGS. 7(a) through 7(h) schematically represent the exchange of information between a mobile terminal 36 and the host computer 30 in accordance with the exemplary embodiment of the invention. It will be appreciated that, with respect to communications between the mobile terminal 36 and the host computer 30, the base station 26 to which the mobile terminal 36 is registered serves as an interface between the mobile terminal 36 and the host computer 30 as is well known in the art. As represented in FIG. 7(a), when the mobile terminal 36 undergoes its boot-up initialization routine the mobile terminal 36 transmits a Bootp Request packet 100 to the host computer 30. The Bootp Request packet 100 is a packet which includes a header field 102 (e.g., synchronization bits, etc., as is conventional), a hardware address field 103 which holds the hardware address of the mobile terminal 36, and a boot request field 104 which contains information requesting that the host computer 30 furnish information relating to the boot-up procedures of the mobile terminal 36. The Bootp Request packet 100 is generated by the processor 40 within the mobile terminal 36.

As is represented in FIG. 7(b), the host computer 30 receives the Bootp Request packet 100 and, in response, the processor 64 generates and transmits a Bootp Response packet 110 back to the mobile terminal 36. The Bootp Response packet 110 includes a header 111; an IP address field 112 containing the IP address of the mobile terminal 36; a package name field 113 containing the name of the package of operating software associated with the mobile terminal 36; and a boot response information field 114 containing other conventional information which may be associated with the boot-up procedures of the mobile terminal 36.

More specifically, when the host computer 30 receives the Bootp Request packet 100 from the mobile terminal 36, the processor 64 performs a look-up in the bootptab table stored in the memory 66 based on the hardware address contained in the hardware address field 103. Specifically, the processor 64 looks up the entry in the bootptab table having the same hardware address. The processor 64 then takes the corresponding IP address and package name from the bootptab table and includes them in the IP address field 112 and package name field 113, respectively, of the Bootp Response packet 110 which is transmitted to the mobile terminal 36. Communication regarding the software stored in the mobile terminal 36 may now occur by referring to the assigned package name. It will be appreciated that while in the present embodiment the boot up procedure is shown to generally follow a bootp protocol, a dynamic host configuration protocol (DHCP) could alternatively be used. Still further, the boot up procedure could optionally be avoided altogether by directly/manually inputting the needed boot up information into the mobile terminal 36 including information such as, for example, the IP address of the mobile terminal 36 and the name of the server with which the mobile terminal 36 is to communicate.

Following this bootup routine, the host computer 30 transmits a Version Request Packet 118 to the mobile terminal 36 as shown in FIG. 7(c). The host computer 30 may transmit the Version Request Packet 118 at some predetermined time after the bootup routine or may periodically send a Version Request Packet 118 to the mobile terminal 36 at multiple random or preset times, for example. The Version Request Packet 118 includes a header 120; a package name field 121; and a version request field 122. The Version Request Packet 118 requests the mobile terminal 36 to transmit back to the host computer 30 the current version of operating software stored in memory 50 (FIG. 2).

In response to receiving the Version Request Packet 118 the mobile terminal 36 transmits to the host computer 30 a Version Response Packet 124 as shown in FIG. 7(d). The Version Response Packet 124 includes a header 125; a package name field 126; and a version indicator field 127.

The version indicator field 127 includes the latest version of operating software corresponding to the package name 126 stored in the mobile terminal 36.

Following receipt of the Version Response Packet 124, the host computer 30 performs a comparison between the version indicator stored in the version indicator field 127 and the version of the corresponding operating software stored in the FTP server 31. Once the host computer 30 completes its comparison, the host computer 30 transmits a File Name Packet 128 to the mobile terminal 36 as shown in FIG. 7(*e*). The File Name Packet 128 includes a header 129, and a comparison result field 133. In the event the comparison performed by the host computer 30 showed that the version of operating software stored in the mobile terminal 36 is the same as the latest version of corresponding operating software stored at the FTP server 31, the host computer 30 includes indicia in the comparison result filed 133 indicating that no update is needed. In the present embodiment, when the versions are identical, the host computer 30 includes the version of the operating software in the comparison result field 133. Thus, upon receipt of the File Name Packet 128, the mobile terminal 36 is able to discern that no additional downloading of operating software is necessary.

If, on the other hand, the host computer 30 determines from its comparison that the version of operating software stored in the mobile terminal 36 does not match the version of operating software stored by the FTP server 31, the host computer 30 includes in the comparison result field 133 the file name of the file to be downloaded from the FTP server 31. Alternatively, in another embodiment, the comparison result field 133 may include the contents of the package definition file for the corresponding package name (FIGS. 5*a*–5*d*). By providing the mobile terminal 36 with the contents of the package definition file, the mobile terminal 36 is informed not only that updated operating software is to be downloaded, but also the required memory, file transfer mode, memory paths, file types, etc. as discussed above with respect to FIGS. 5*a*–5*d*.

In the event the mobile terminal 36 is informed that a download of updated operating software is needed, the mobile terminal 36 downloads the appropriate software from the FTP server 31.

For example, FIG. 7(*f*) illustrates a File Request Packet 130 which is generated by the mobile terminal processor 40 and which includes a header 131 and a file request field 132. The file request field 132 includes the file name provided from the FTP server 31 which the mobile terminal 36 is to download.

The mobile terminal 36 transmits the File Request Packet 130 to the FTP server 31 as represented in FIG. 7(*f*), and in response the FTP server 31 forms a File Packet 134 which is transmitted back to the mobile terminal 36. The File Packet 134 includes a header 135 and a file field 136. The file field 136 includes one or more files associated with the file name requested in the file request field 132. Consequently, the files are downloaded to the mobile terminal 36 where each of the files are, for example, flashed into the memory 50 (FIG. 2) and stored for use in the operations of the mobile terminal.

In an alternative embodiment of the present invention where, for example, the host computer 30 returns a package definition packet 128 to the mobile terminal 36 in FIG. 7(*e*) as opposed to a file name, the mobile terminal 36 begins the process of sequentially stepping through each file name listed in the package definition file and transmitting a request that the FTP server 31 transfer the actual file so that it may be downloaded and stored in the mobile terminal 36. Next, the mobile terminal 36 generates and transmits another File Request Packet 130 requesting that the next file included in the list of file names in the package definition field 126 be downloaded to the mobile terminal 36. Similarly, the FTP server 31 responds by transmitting another File Packet 134 including the contents of the file named in the file request field 132. Such sequential exchange of file requests and the transfer of files between the mobile terminal 36 and the FTP server 31 continues as represented in FIGS. 7(*f*)–7(*i*) until the mobile terminal has requested and received each of the files named in the Package Definition Packet received in the comparison result field 133. Depending on the particular file transfer protocol utilized within the system, the file request field 132 may also have such information as the location at which the particular file is stored in the FTP server 31, etc., as obtained from the package definition table 126. However, it will be appreciated that the actual file transfer protocol utilized in accordance with the present invention can be any well known transfer protocol and is not limited to any particular one.

Accordingly, it will be appreciated that files from the FTP server 31 will not be downloaded to a mobile terminal 36 until and unless it has been determined by the host computer 30 that a new version of mobile terminal operating software exists in the FTP server 31. In the event it is determined that a new version exists, every file corresponding to a file name or package name is downloaded regardless of whether only one file or more than one of the files associated with the file name has been changed, added and/or deleted.

As explained above, when using the package definition file the amount of memory which the mobile terminal will need in order to download all of the files listed in the package definition file and the mode of replacing the information in the mobile terminal is provided to the mobile terminal by the host computer 30. More particularly, there are two exemplary modes in which the mobile terminal 36 may download the new version of the mobile terminal operating software to replace an old version. One method is known as the replace mode, and the second method is known as the fail safe mode. If the information in the package definition file indicates that the mobile terminal 36 should be operating in the replace mode, then anytime there is a new version of operating software to be downloaded the mobile terminal 36 is programmed to discard immediately the old version of each file prior to downloading the package of new files. The disadvantage of the replace mode is that it is possible that the mobile terminal 36 will fail such as, for example, run out of memory space, experience an RF link failure or host computer failure, etc., prior to receiving all of the files of the new version. In this case, the mobile terminal will not have a complete copy of either the old or new versions. In the fail safe mode, however, all files in the old version remain saved in the mobile terminal memory until all files belonging to the new version have been downloaded successfully. Only after all of the files belonging to the new version have been received does the mobile terminal 36 discard the old version of the files. Thus, the mobile terminal 36 has the ability to operate using the old version in the event of a problem in downloading the new version. The disadvantage is that the fail safe mode requires more memory in the mobile terminal 36 as compared to the replace mode.

Figure 8A:
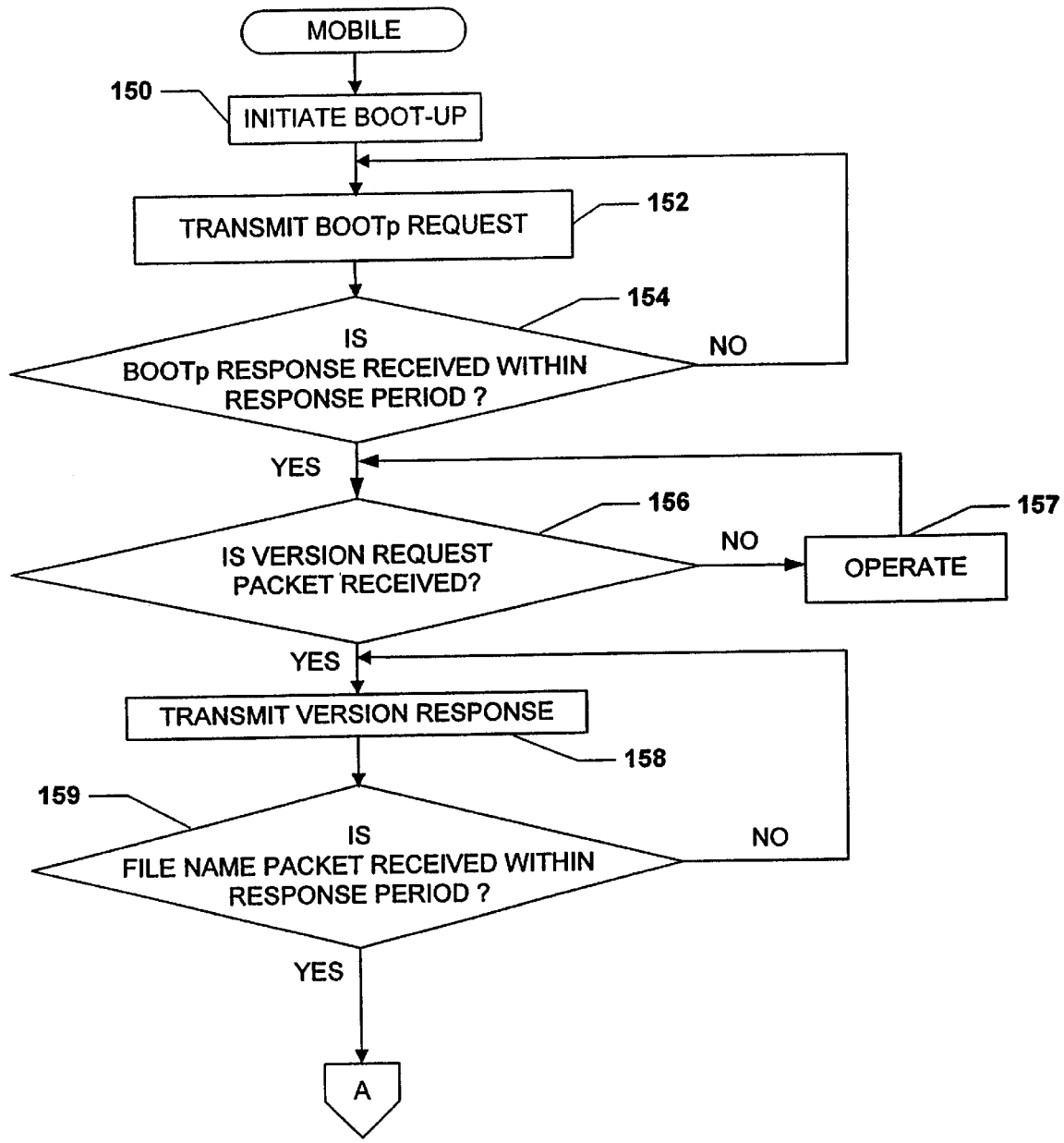
FIGS. 8a and 8b is a system flowchart suitable for programming a mobile terminal to request and download upgraded operating software in accordance with the present invention.
Figure 8B:
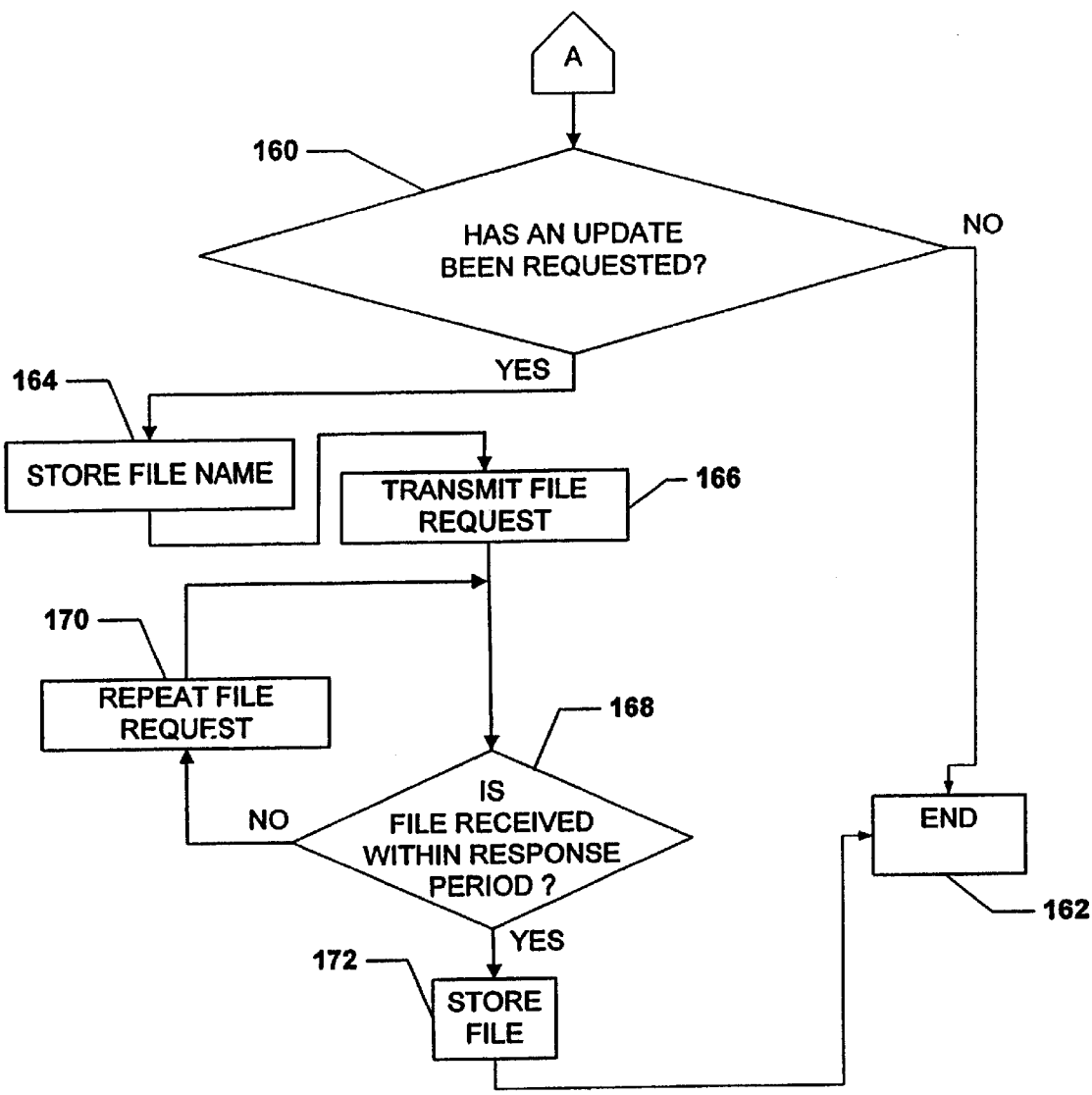

FIG. 8(*a*) illustrates the basic operation of the mobile terminal 36 in accordance with the procedures described above. Beginning in step 150, the processor 40 within the mobile terminal 36 initiates its own internal boot-up routine upon being powered up and/or reset as is conventional.

Next, in step 152 the processor 40 generates and transmits a Bootp Request Packet 100 to the host computer 30 as represented in FIG. 7(*a*). Following step 152, the processor 40 determines in step 154 whether a Bootp Response Packet 110 is received back from the host computer 30 within a predetermined response period (e.g., five seconds). If not, the processor 40 returns to step 152 and retransmits the Bootp Request Packet 100. If the Bootp Response packet 110 is received by the processor 40 in step 154 as illustrated in FIG. 7(*b*), the processor 40 proceeds to step 156 in which it determines whether a Version Request Packet 118 has been received from the host computer 30 as illustrated in FIG. 7(*c*). If no Version Request Packet 118 is received, the processor 40 proceeds to step 157 where it begins or continues operations in accordance with the operating software currently loaded therein. Following step 157, the processor 40 returns to step 156 to again determine if the Version Request Packet 118 has been received.

If the Version Request Packet 118 has been received, then the processor 40 continues to step 158 wherein the processor 40 transmits to the host computer 30 the Version Response Packet 124 as illustrated in FIG. 7(*d*). Following step 158, the processor determines in step 159 whether a File Name Packet 128 has been received from the host computer 30 in response to the Version Response Packet 124 within a predetermined response period (e.g., five seconds). If not, the processor 40 returns to step 158 and retransmits the Version Response Packet 124.

Upon determining that a File Name Packet 128 has been received in step 159, the processor 40 in step 160 determines whether the host computer. 30 has requested the mobile terminal 36 to receive updated operating software. As discussed above, the processor 40 of the mobile terminal 36 knows that a request to obtain updated operating software is made in those instances where the host computer 30 includes a file name in the comparison result field 133 as illustrated in FIG. 7(*e*). Similarly, the processor 40 knows if host computer 30 has not requested that an updated be made if the processor 40 finds only indicia representative of the version of its operating software in the comparison result field 133. Accordingly, if, the processor 40 determines that the host computer 30 has not requested that any updates of the mobile terminal 36 operating software be made, it is concluded that the mobile terminal 36 will operate on the existing mobile terminal operating software stored therein and the processor proceeds to step 162. In step 162, the mobile terminal 36 continues normal operation with the operating software loaded thereon.

In the event the processor 40 determines in step 160 that the host computer 30 has requested that updated operating software be downloaded, the processor 40 continues to step 164 in which it stores in the memory 50 (FIG. 2) the file name to be downloaded. The processor 40 then proceeds to step 166 in which it transmits a File Request Packet 130 as represented in FIG. 7(*f*) to the FTP server 31 in order to request that the files associated with the file name be transferred from the FTP server 31 to the mobile terminal 36. Next, in step 168 the processor 40 determines if a corresponding File Packet 134 containing the requested files is received back from the FTP server 31 within a predetermined response period (e.g., five seconds). If not, the processor 40 proceeds to step 170 in which it retransmits the same file request previously transmitted in step 166. The processor 40 then returns to step 168 as shown.

If the File Packet 134 is received by the processor 40 as determined in step 168 and as represented in FIG. 7(*f*), the processor 40 proceeds to step 172. In step 172 the processor 40 stores each file contained in the file field 136 in the mobile terminal memory 50 by, for example, flashing the memory with the updated files. Thereafter, the processor 40 proceeds from step 172 to step 162 mentioned above and ends the update procedure.

Regarding steps 154, 156, 159 and 168 discussed above, it will be appreciated that the processor 40 preferably is programmed to retransmit a respective packet only a predetermined number of times (e.g., five), and to terminate the routine in the event a response still is not received. This avoids the mobile terminal becoming hung up due to a system failure. In such case, the processor 40 allows the mobile terminal 36 to continue to operate with the existing version of software stored therein.

Figure 9:
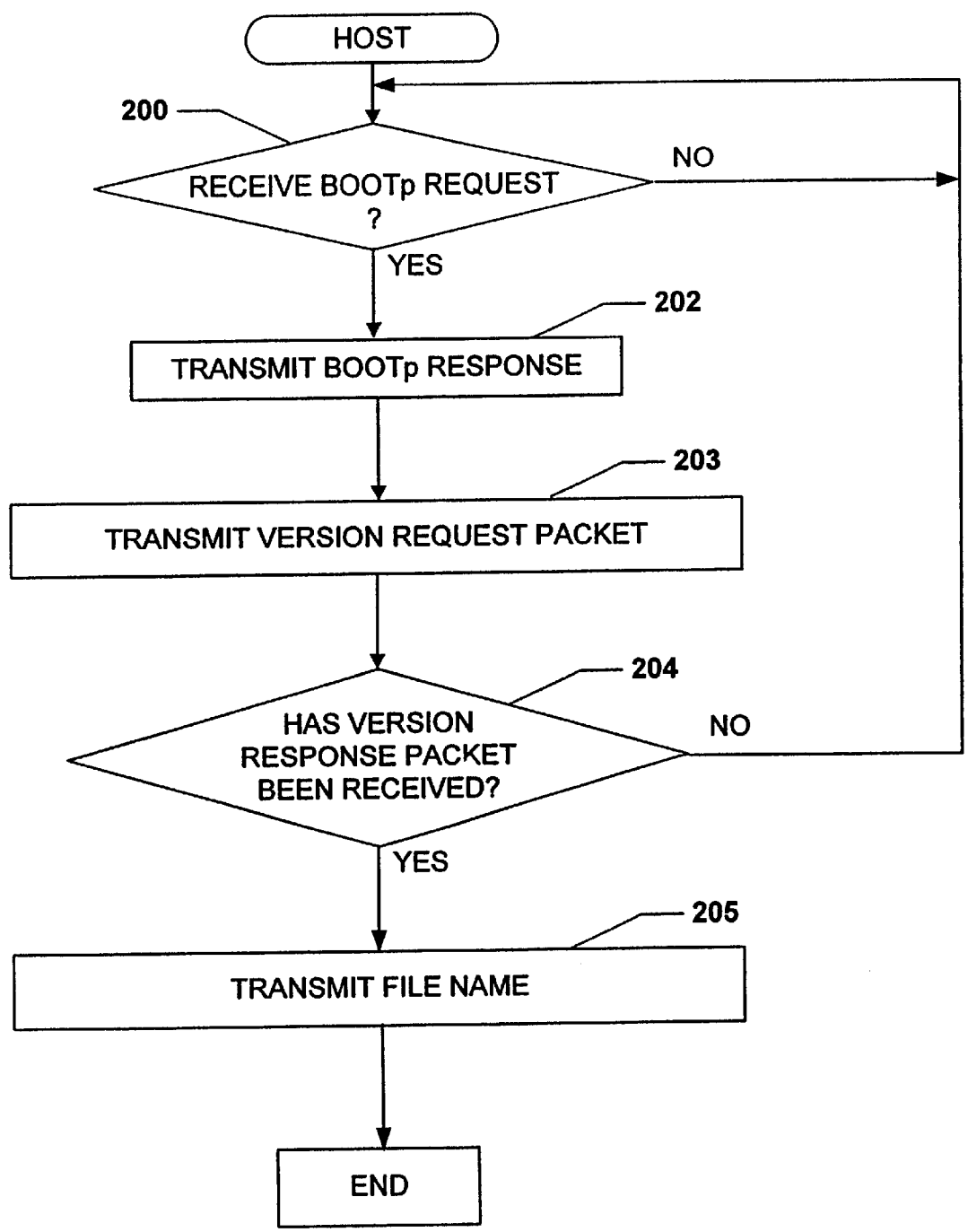
FIG. 9 is a system flowchart suitable setting up the host computer to respond to the mobile terminal in accordance with the present invention.

Referring now to FIG. 9, the operation of the host computer 30 is illustrated during the boot-up routine of the mobile terminal 36. Beginning in step 200, the host computer processor 64 determines if a Bootp Request Packet 100 has been received from a mobile terminal 36 as represented in FIG. 7(*a*). If not, the processor 64 continues to loop through step 200. If a Bootp Request Packet 100 is received, the processor 64 proceeds to step 202 in which the processor 64 transmits a Bootp Response Packet 110 in response as represented in FIG. 7(*b*). Next, in step 203, the processor 64 transmits a Version Request Packet 118 to the mobile terminal 36 as illustrated in FIG. 7(*c*). In the present embodiment, the Version Request Packet 118 is transmitted at a predetermined period of time of 10 seconds following the boot-up procedure. However, it will be appreciated that the Version Request Packet 118 may be transmitted at one or more different times following boot-up. For example, the processor 64 may be configured to transmit a Version Request Packet 118 following boot-up and following each update of operating software.

Next, in step 204 the processor 64 determines if the host computer 30 receives a Version Response Packet 124 within a predetermined period of time (e.g., five seconds). If not, the processor 64 returns to step 200. Otherwise, upon receiving the Version Response Packet (as represented in FIG. 7(*c*)), the processor 64 proceeds from step 204 to step 205.

In step 205, the processor 64 of the host computer 30 does a comparison of the version identifier of operating software provided from the mobile terminal 36 with the version identifier of the corresponding software stored in the FTP server 31. If the versions are the same, the processor 64 stores in the comparison result field 133 of the File Name Packet 128 the current version number of the operating software being run by the mobile terminal 36 so as to indicate to the mobile terminal 36 that no further downloading of software is needed. If, however, the versions are different, the processor 64 stores in the comparison result field 133 File Name of the packet to be downloaded from the FTP server 31. Next, in step 205, the processor 64 transmits back to the mobile terminal 36 the File Name Packet 128 having the appropriate contents filled into the comparison result field 133 so as to either request or not request that the mobile terminal download updated, modified, or new operating software from the FTP server 31.

Those having ordinary skill in the art will appreciate that steps 200 and 202 in FIG. 9 can be carried out by a Bootp server (not shown) included in the host computer 30.

Throughout the routine described with respect to FIG. 9, the processor 64 of the host computer 30 continually determines whether any software has been updated in the FTP server 31 and if so, the host computer 30 immediately updates its memory 66.

Figure 10:
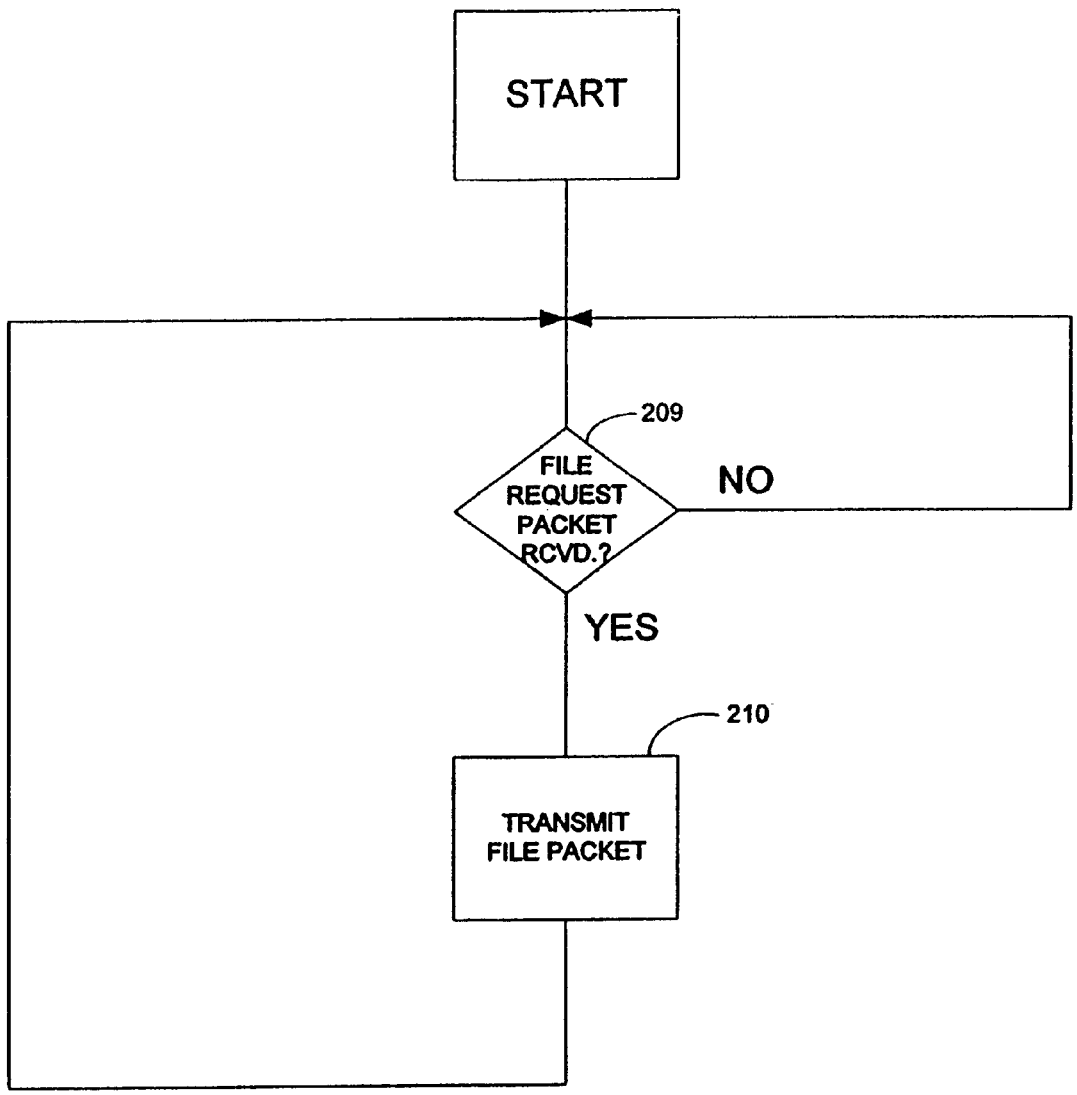
FIG. 10 is a system flowchart suitable for setting up the FTP server in accordance with the present invention.

Referring now to FIG. 10, the operations of the FTP server 31 is provided. In step 209, the processor 65 determines whether a file request packet as illustrated in FIG. 7(f) has been received from a mobile terminal. If no file request packet is received, the processor 65 returns to step 209. If, however, a file request packet is received, the processor 65 proceeds to step 210 where the processor 65 of the FTP server 31 transmits a File Packet 134 as illustrated in FIG. 7(g) to the mobile terminal 36. In this manner, the mobile terminal 36 is able to download the updated operating software. If multiple file request packets are sent by the mobile terminal 36, the processor 65 will service each request during a repetition of steps 209 and 210. It will be appreciated, that while steps 209–210 are shown to be carried out by an independently operating FTP server 31, the FTP server 31 could be included within the host computer 30 or the host computer 30 could itself carry out all of the functions of the FTP server 31.

Figure 11:
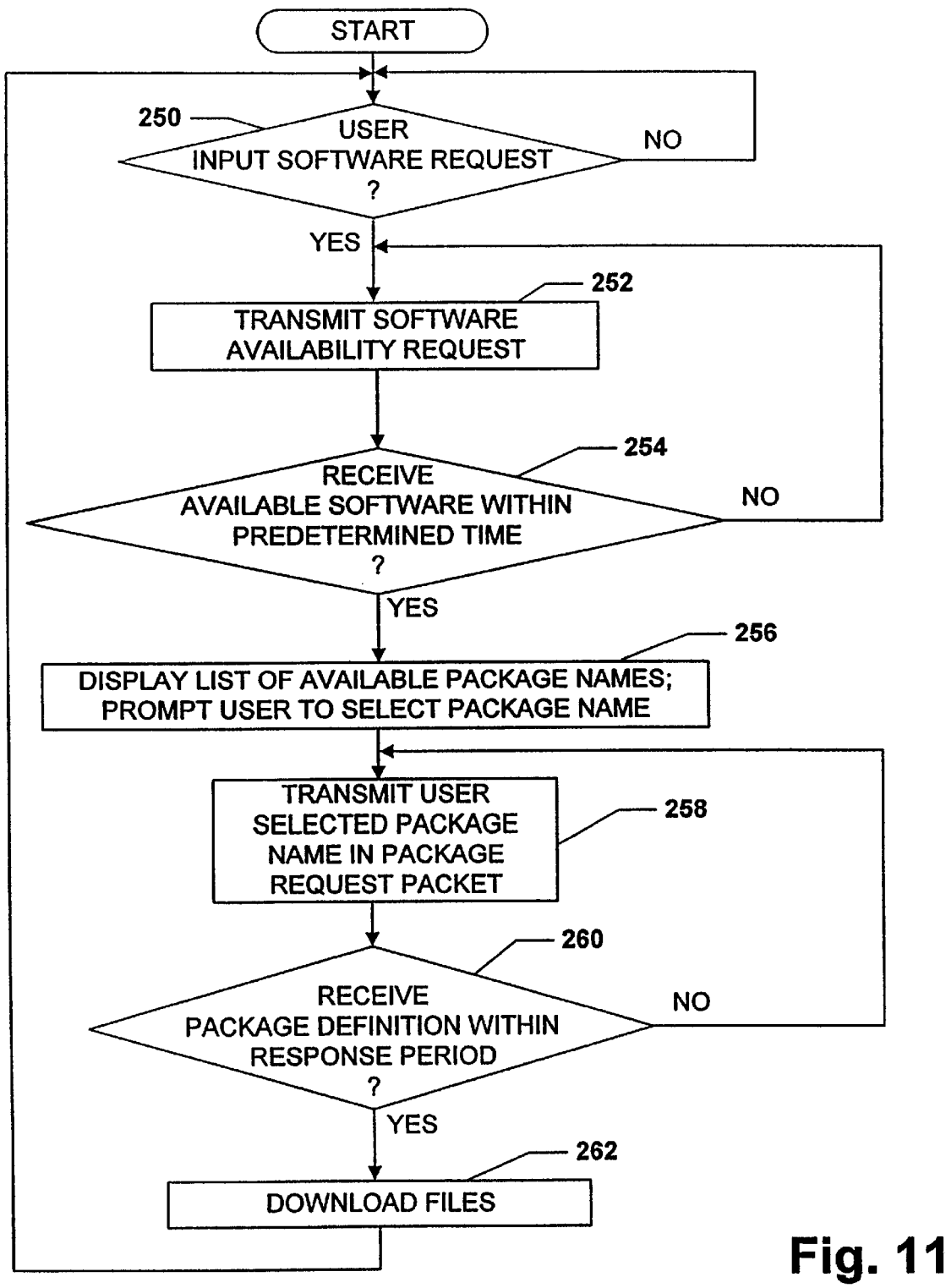
FIG. 11 is a system flowchart suitable for programming the mobile terminal and setting up the host computer and FTP server to enable a user to select from among different packages of operating software available from the FTP server in accordance with the present invention.

Referring now to FIG. 11, an aspect of the invention whereby a mobile terminal user may selectively download operating software from the FTP server 31 will be explained. Such aspect allows the mobile terminal user to input via the user input device 42 (FIG. 2) a selection of available packages of software which may be downloaded from the FTP server 31. The available software packages are displayed on the display 46, and the user presses a key on the input device 42 corresponding to the desired package. The mobile terminal 36 and the FTP server 31 are programmed to exchange the appropriate files and file information automatically as described below.

More specifically, beginning in step 250 the processor 40 of the mobile terminal 36 is programmed to determine if the user inputs a request for available software. Such a request can be a predefined selection of one or more keys on the user input device 42. Until such time as the user inputs such a request, the processor 64 continues to loop through step 250. Upon receiving such a request as determined in step 250, the processor 40 proceeds to step 252 in which the processor 40 transmits a request packet to the host computer 30 requesting that the host computer 30 transmit a list of the package names corresponding to the package definition files stored in the memory 66. In response to the request packet the host computer processor 64 is programmed to generate a list of the package names (e.g., Package A, Package B, etc.) and transmit the list to the mobile terminal 36.

Following step 252, the processor 40 determines in step 254 whether the list of package names has been received from the host computer 30 within a predetermined time (e.g., five seconds). If not, the processor 40 returns to step 252 and retransmits the request packet. Otherwise, upon receiving the list of package names as determined in step 254, the processor 40 proceeds to step 256 in which it displays on the display 46 the list of package names received from the host computer 30. In addition, the processor 40 prompts the user via the display 46 to select the desired package name. Such selection may be made by the user by pressing keys on the input device 42 identified on the display as corresponding to the respective possible selections, for example, or alternatively cursor keys and other input techniques could also be used.

Upon receiving the user selection in step 256, the processor 40 proceeds to step 258 in which the processor 40 forms and transmits to the host computer 30 a Version Response Packet 124 of the same format represented in FIG. 7(d). Included in the package name field 126 is the package name selected by the user in step 256. The host computer processor 64 is set up to receive the Version Response Packet 124 and transmit in response a File Name Packet 128 of the same format represented in FIG. 7(e). In particular, when an unsolicited version response packet is received by the host computer 30, the processor 64 includes in the comparison result field 133 of the File Name Packet 128 the contents of the package definition file as shown in FIGS. 5a–5d. In step 260, the mobile terminal processor 40 determines whether a package definition packet 124 has been received within a predetermined response period (e.g., five seconds). If not, the processor 40 returns to step 258 in which the Version Response Packet 124 is retransmitted to the host computer 30.

On the other hand, if the package definition packet 124 is received as determined in step 260, the processor 40 proceeds to step 262 in which it downloads the files corresponding to the selected package name. Specifically, in step 262 the mobile terminal 36 and the FTP server 31 exchange File Request Packets 130 and File Packets 134 in the same manner as is described above in relation to FIGS. 8, 9 and 10. As a result, the files corresponding to the package name selected by the user are downloaded to the mobile terminal 36. Thus, the present invention provides considerable user flexibility in determining software to be downloaded.

Figure 12:
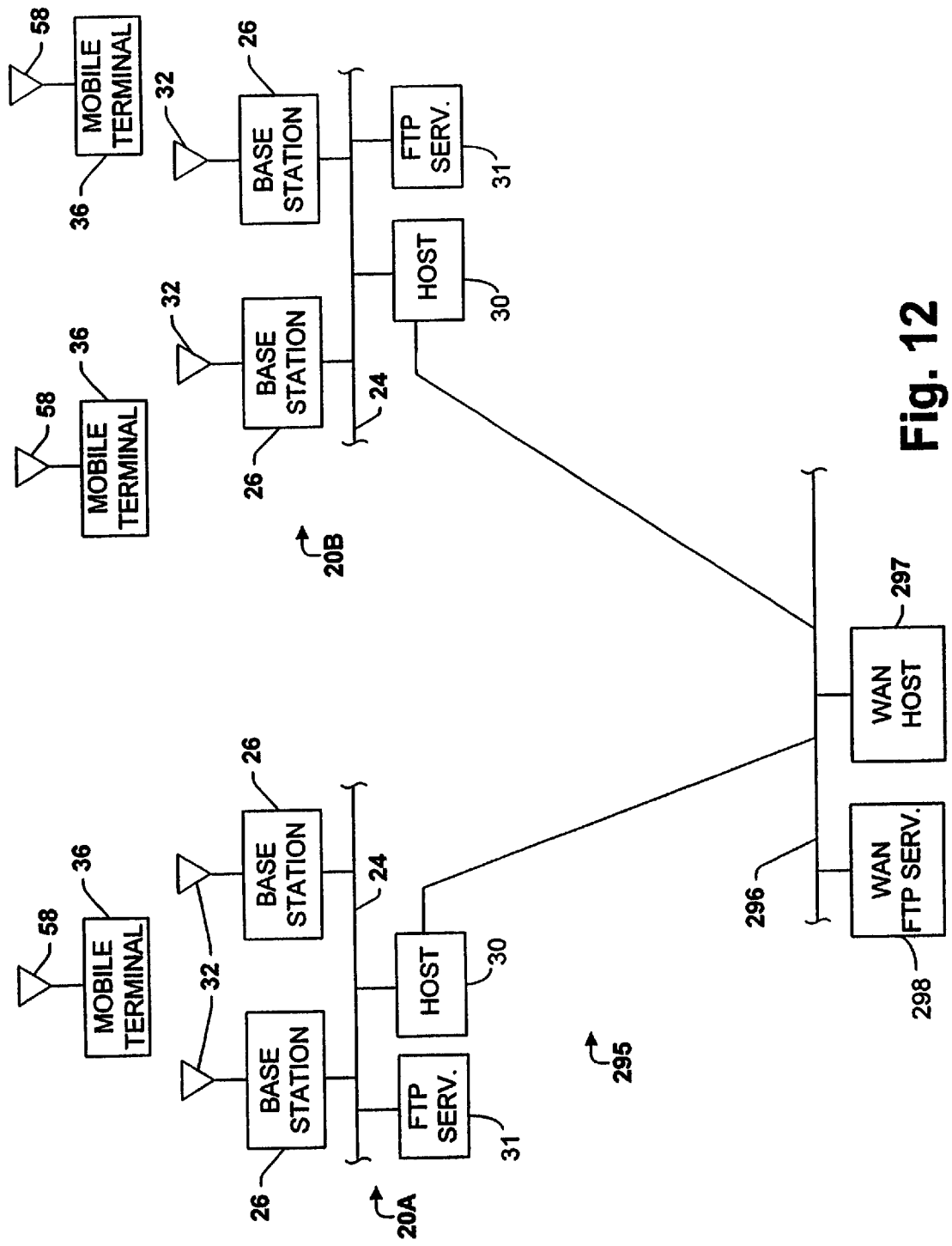
FIG. 12 is a block diagram of a WAN based system in accordance with the present invention.

Referring now to FIG. 12, a wide area network (WAN) 295 is shown in accordance with another aspect of the invention. The WAN 295 in the exemplary embodiment includes a plurality of local area network (LAN) communication systems 20 of the type shown in FIG. 1, the respective systems being identified as 20A and 20B in FIG. 11. The WAN 295 includes a WAN based system backbone 296 to which the host computer 30 in each of the systems 20A and 20B is connected. The system backbone 296 may be any conventional internet connection, whether hardwired and/or wireless. Also connected to the system backbone 296 is a WAN host computer 297 for carrying out host computer activities on the WAN 295 and a WAN FTP server 298 for carrying out FTP server activities on the WAN 295.

By virtue of the WAN host computer 297 and WAN FTP server 298 being linked to the host computers 30 and FTP server 31 in each of the systems 20A and 20B, it is possible to perform global software upgrades. Specifically, the WAN host computer 297 can broadcast to each host computer 30, via the system backbone 296, an updated Package Definition table (FIG. 5) and the WAN FTP server 298 can broadcast the updated mobile terminal operating software relating to the Package Definition table. The host computer 30 in each system 20A and 20B replaces the previous Package Definition table previously stored in its memory with the new table and files. Thus, the next time the mobile terminals 36 in the respective systems 20A and 20B boots up or otherwise attempts to download a new version of operating software, information concerning the available software will be available by the host computer 30 and the software itself will be available in the FTP server 31. Consequently, entire networks can be updated quickly and uniformly. It will be appreciated, that while the WAN 295 is shown to include the WAN FTP server 298, the WAN FTP server 298 could be included in the WAN host computer 297 or the WAN host computer could be configured to perform the functions of the WAN FTP server 298. In such a case, the WAN host computer 297 would communicate with the host computers 30 in the respective systems and, if there was also FTP servers 31 in the systems, the WAN host computer 297 would also communicate the appropriate information thereto.

Although certain preferred embodiments have been described above, it will be appreciated that alterations, modifications, and equivalents thereto are deemed part of the invention. For example, the present embodiment has been described with respect to the host computer 30 comparing the version of operating software it currently has stored within its memory with the version of software stored in the mobile terminal 36, and if the mobile terminal 36 has a different version of operating software stored within, the host computer 30 requests the mobile terminal 36 to download an upgraded version of the operating software from the FTP server 31. However, it will be appreciated that the mobile terminal 36 can make the comparison of the operating software within to that stored in the host computer 30 or FTP server 31 based on version information provided by the host computer 30 in the Bootp Response packet, for example. If the mobile terminal 36 determines the host computer 30 and/or FTP server 31 has a different version of operating software than the mobile terminal 36, the mobile terminal 36 can make the determination to upgrade the operating software of the and transmit to a File Request packet to the FTP server 31 to receive an upgraded version of the software.

With respect to FIGS. 7–10 above, the host computer 30 is shown to initiate a software upgrade at some point following the mobile terminal boot-up routine. In an alternative embodiment of the present invention described below, however, it will be appreciated that the mobile terminal may initiate the software upgrade by communicating with the host computer at any time during or after the mobile terminal boot-up routine. Further, in the alternative embodiment described below, the operating software is said to be stored in the host computer 30. However, it will be appreciated that the operating software could be stored in the FTP server 31 as discussed above.

Referring initially to FIG. 13(a)–13(d), the package definition files for the present embodiment are depicted. The package definition files are stored in the memory 66 (FIG. 3a) of the host computer 30. FIG. 13(a) illustrates generally the various information fields included in each package definition file, whereas FIGS. 13(b)–13(d) provide illustrative examples of different package definition files. Each of the fields of the package definition file shown in FIGS. 13(a)–13(d) are substantially similar to that described above with respect to the package definition file shown in FIGS. 5(a)–5(d) except with respect to the path in memory as to where each file is stored. Accordingly, discussion related to the similar fields are not again provided for sake of brevity. With respect to the path information, in the present embodiment each of the operating software files are stored in the host computer memory 66 and not the FTP server memory 67 as discussed in the previous embodiment. Thus, as shown in FIGS. 13(a)–13(d), the path field of each package definition file includes the host computer path (e.g., the directory path) indicating where in the host computer memory 66 the respective files are stored. This is represented by the "Host Path" field shown in FIG. 13(a).

FIGS. 14(a) through 14(h) schematically represent the exchange of information between a mobile terminal 36 and the host computer 30 in accordance with an alternative embodiment of the invention. It will be appreciated that, with respect to communications between the mobile terminal 36 and the host computer 30, the base station 26 to which the mobile terminal 36 is registered serves as an interface between the mobile terminal 36 and the host computer 30 as is well known in the art. As represented in FIG. 14(a), when the mobile terminal 36 undergoes its boot-up initialization routine the mobile terminal 36 transmits a Bootp Request packet 300 to the host computer 30. The Bootp Request packet 300 is a packet which includes a header field 302 (e.g., synchronization bits, etc., as is conventional), a hardware address field 303 which holds the hardware address of the mobile terminal 36, and a boot request field 304 which contains information requesting that the host computer 30 furnish information relating to the boot-up procedures of the mobile terminal 36. The Bootp Request packet 300 is generated by the processor 40 within the mobile terminal 36.

As is represented in FIG. 14(b), the host computer 30 receives the Bootp Request packet 300 and, in response, the processor 64 generates and transmits a Bootp Response packet 310 back to the mobile terminal 36. The Bootp Response packet 310 includes a header 311; an IP address field 312 containing the IP address of the mobile terminal 36; a package name field 313 containing the name of the package of operating software associated with the mobile terminal 36; and a boot response information field 314 containing other conventional information which may be associated with the boot-up procedures of the mobile terminal 36.

More specifically, when the host computer 30 receives the Bootp Request packet 300 from the mobile terminal 36, the processor 64 performs a look-up in the bootptab table stored in the memory 66 based on the hardware address contained in the hardware address field 303. Specifically, the processor 64 looks up the entry in the bootptab table having the same hardware address. The processor 64 then takes the corresponding IP address and package name from the bootptab table and includes them in the IP address field 312 and package name field 313, respectively, of the Bootp Response packet 310 which is transmitted to the mobile terminal 36.

Upon receiving the Bootp Response Packet 310, the mobile terminal 36 as represented in FIG. 14(c) transmits a Package Request Packet 318 to the host computer 30. The Package Request Packet 318 includes a header field 320; a package name field 321; and a package request information field 322 for any other conventional information which is utilized in a given system. Notably, the package name field 321 includes the package name previously received in the Bootp Response Packet 310 as represented in FIG. 14(b). The mobile terminal processor 40 temporarily stores the package name received in field 313 and generates the Package Request Packet 318 with the package name included in field 321. The purpose of the Package Request Packet 318 is to prompt the host computer 30 to transmit back to the mobile terminal 36 a Package Definition Packet which includes the contents of the package definition file (FIGS. 13(a)–13(d)) for the particular package name. More particularly, upon receiving the Package Request Packet 318 the host computer processor 64 takes the package name included in the package name field 321 and uses the package name to access the corresponding package definition file stored in the memory 66.

Specifically, the processor 64 forms a Package Definition Packet 324 as represented in FIG. 14(d). The packet 324 includes a header 325 and a package definition field 326. The packet definition field 326 includes all of the information in the package definition file for the particular package name identified in the field 321. In particular, the package definition field 326 includes the version identifier and the list of file names together with the previously described information relating to the required memory, file transfer mode, memory paths, file types, etc. The host computer 30 then transmits the Package Definition Packet 324 to the mobile terminal 36 as represented in FIG. 14(d).

Upon receiving the Package Definition Packet 324, the mobile terminal processor 40 initially compares the version identifier included in the package definition field 326 with the version identifier previously stored by the processor 40 the last time the mobile terminal downloaded files from the host computer 30. If the versions are identical, then the mobile terminal 36 concludes that no upgrades or revisions have been performed to the files included in the respective package. If the versions are different, then the mobile terminal 36 stores the information from the Package Definition Packet 324 and then begins the process of sequentially stepping through each file name listed in the package definition file in the package definition field 326 and transmitting a request that the host computer 30 transfer the actual file so that it may be downloaded and stored in the mobile terminal 36. For example, FIG. 14(e) illustrates a file request packet 330 which is generated by the mobile terminal processor 40 and which includes a header 331 and a file request field 332. The file request field 332 includes the name of the next file which the mobile terminal 36 requests to be downloaded from the host computer 30 to the mobile terminal 36. Depending on the particular file transfer protocol utilized within the system, the file request field 332 may also have such information as the location at which the particular file is stored in the host computer 30, etc., as obtained from the package definition table 326. However, it will be appreciated that the actual file transfer protocol utilized in accordance with the present invention can be any well known transfer protocol and is not limited to any particular one.

The mobile terminal 36 transmits the file request packet 330 to the host computer 30 as represented in FIG. 14(e), and in response the host computer 30 forms a file packet 334 which is transmitted back to the mobile terminal 36. The file packet 334 includes a header 335 and a file field 336. The file field 336 includes the contents of the file named in the file request field 332. Consequently, the file is downloaded to the mobile terminal 36 where it is stored for use in the operations of the mobile terminal. Next, the mobile terminal 36 generates and transmits another file request packet 330 requesting that the next file included in the list of file names in the package definition field 326 be downloaded to the mobile terminal 36. Similarly, the host computer 30 responds by transmitting another file packet 334 including the contents of the file named in the file request field 332. Such sequential exchange of file requests and the transfer of files between the mobile terminal 36 and the host computer 30 continues as represented in FIGS. 14(g)–14(h) until the mobile terminal has requested and received each of the files named in the package definition file received in the package definition field 326.

Accordingly, it will be appreciated that files from the host computer 30 will not be downloaded to a mobile terminal 36 until and unless it has been determined that a new version of mobile terminal operating software exists in the host computer 30. In the event it is determined that a new version exists, every file identified in the package definition file for the corresponding package name is downloaded regardless of whether only one file or more than one file has been changed, added and/or deleted in the package.

Figure 15A:
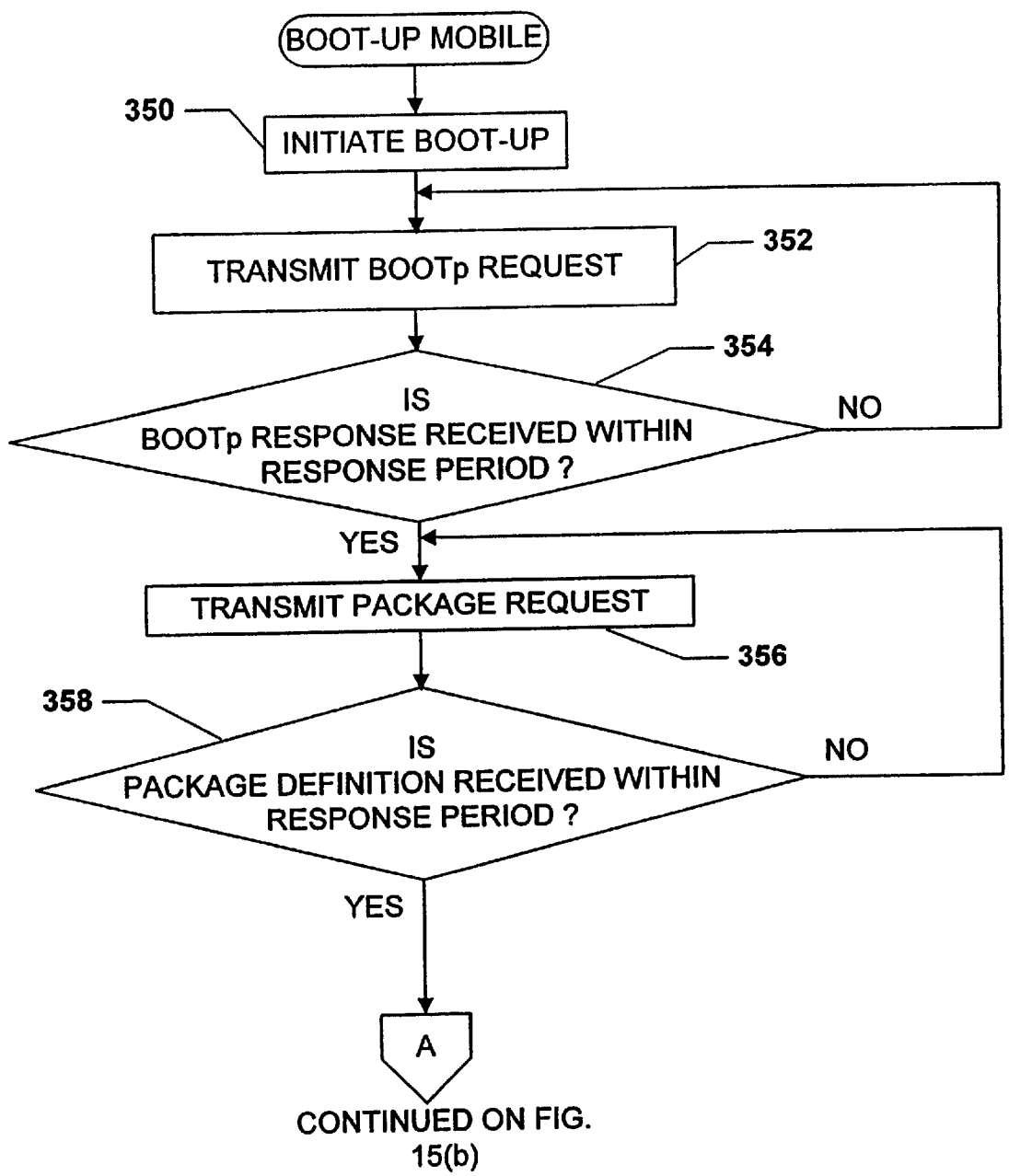
FIGS. 15(a)–15(b) are system flowcharts suitable for programming a mobile terminal to request and download upgraded operating software from the host computer in accordance with an alternative embodiment of the present invention.
Figure 15B:
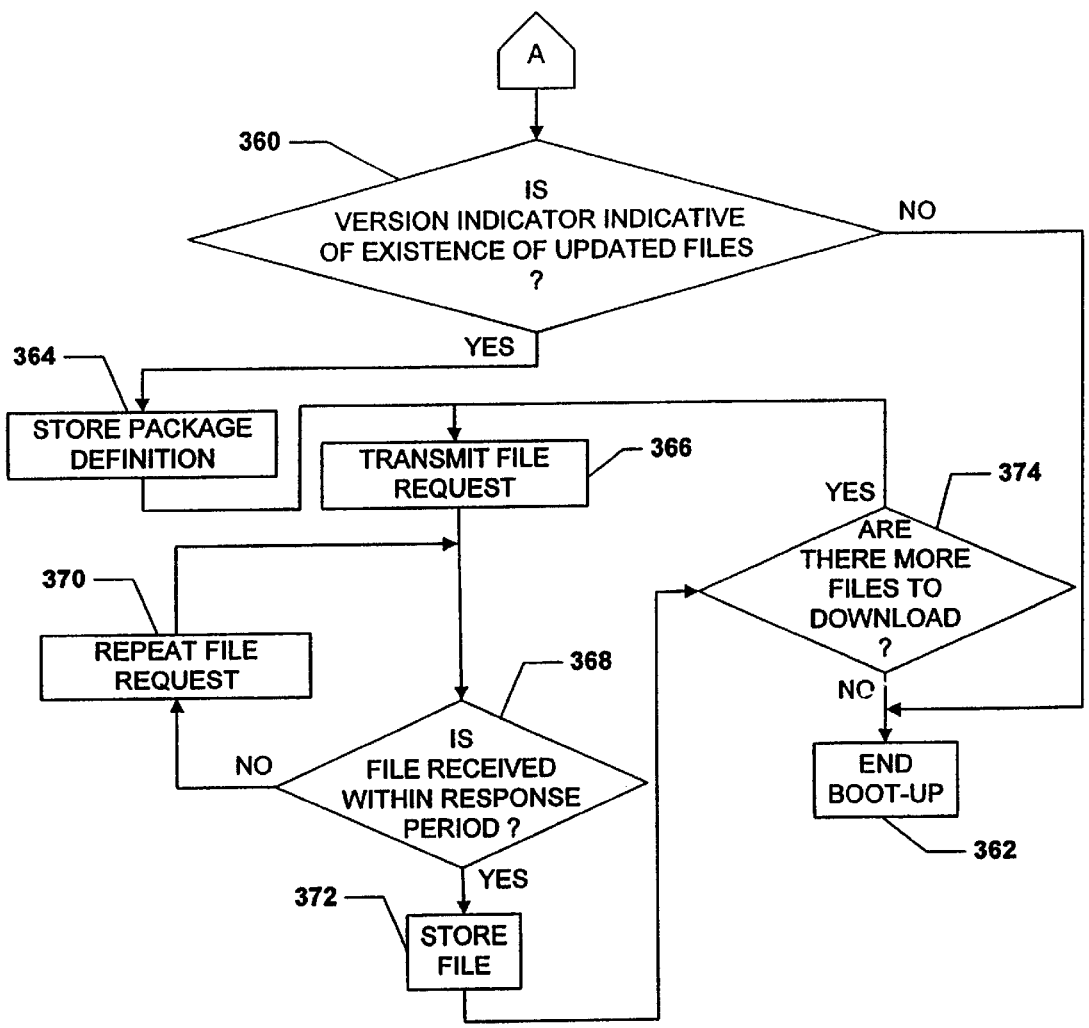

FIGS. 15(a) and 15(b) illustrate the basic operation of the mobile terminal 36 in accordance with the alternative embodiment described above with respect to FIGS. 14(a)–14(h). Beginning in step 350, the processor 40 within the mobile terminal 36 initiates its own internal boot-up routine upon being powered up and/or reset as is conventional. Next, in step 352 the processor 40 generates and transmits a Bootp Request Packet 300 to the host computer 30 as represented in FIG. 14(a). Following step 352, the processor 40 determines in step 354 whether a Bootp Response Packet 310 is received back from the host computer 30 within a predetermined response period (e.g., five seconds). If not, the processor 40 returns to step 352 and retransmits the Bootp Request Packet 300. If the Bootp Response packet 310 is received by the processor 40 in step 354 as illustrated in FIG. 14(b), the processor 40 proceeds to step 356 in which it transmits the Package Request Packet 318 to the host computer 30 as represented in FIG. 14(c). Following step 356, the processor determines in step 358 whether a Package Definition Packet 324 has been received from the host computer 30 in response to the Package Request Packet 318 within a predetermined response period (e.g., five seconds). If not, the processor 40 returns to step 356 and retransmits the Package Request Packet 318.

Upon determining that a Package Definition Packet 324 has been received in step 358 (as represented in FIG. 14(d)), the processor 40 in step 360 compares the version indicator included in the Package Definition Packet 14(d) with the version indicator the processor 40 previously stored in the memory 50 the last time the mobile terminal operating software was downloaded. If, based on such comparison, the processor 40 determines that the versions are the same, the processor 40 proceeds to step 362 in which it is concluded that the mobile terminal 36 will operate on the existing mobile terminal operating software stored therein since there have been no changes to the operating software. In step 362, the mobile terminal 36 completes any other conventional boot-up procedures.

In the event the processor 40 determines in step 360 that the host computer 30 has a new version of the operating software based on a difference between the version indicators, the processor 40 continues to step 364 in which it stores in the memory 50 (FIG. 2) the contents of the package definition field 326. The processor 40 then proceeds to step 366 in which it transmits a file request packet 330 as represented in FIG. 14(e) in order to request that the first file named in the package definition file included in the package definition field 326 be transferred from the host computer 30 to the mobile terminal 36. Next, in step 368 the processor 40 determines if a corresponding file packet 334 containing the requested file is received back from the host computer 30 within a predetermined response period (e.g., five seconds). If not, the processor 40 proceeds to step 370 in which it retransmits the same file request previously transmitted in step 366. The processor 40 then returns to step 368 as shown.

If the file packet 334 is received by the processor 40 as determined in step 368 and as represented in FIG. 14(f), the processor 40 proceeds to step 372. In step 372 the processor 40 stores the file contained in the file field 336 in the mobile terminal memory 50 according to the appropriate mode (e.g., replace or fail safe) and in the location specified by the information previously obtained in the package definition field 326. Thereafter, the processor 40 proceeds to step 374 in which it determines if there are more files to be downloaded from the host computer 30. Specifically, the processor 40 determines whether there exists any more files in the list of file names provided in the package definition field 326 which have not yet been downloaded. If additional files exist, the processor 40 proceeds from step 374 back to step 366 in which the processor 40 transmits a file request packet 330 requesting that the next file in the list be downloaded (e.g., FIG. 14(g)). In the event the last file has already been transferred as determined in step 374, the downloading of the new version of the operating software is complete. Hence, the processor 40 proceeds from step 374 to step 362 mentioned above.

Regarding steps 354, 358 and 368 discussed above, it will be appreciated that the processor 40 preferably is programmed to retransmit a respective packet only a predetermined number of times (e.g., five), and to terminate the routine in the event a response still is not received. This avoids the mobile terminal becoming hung up due to a system failure. In such case, the processor 40 allows the mobile terminal 36 to continue to operate with the existing version of software stored therein.

Figure 16:
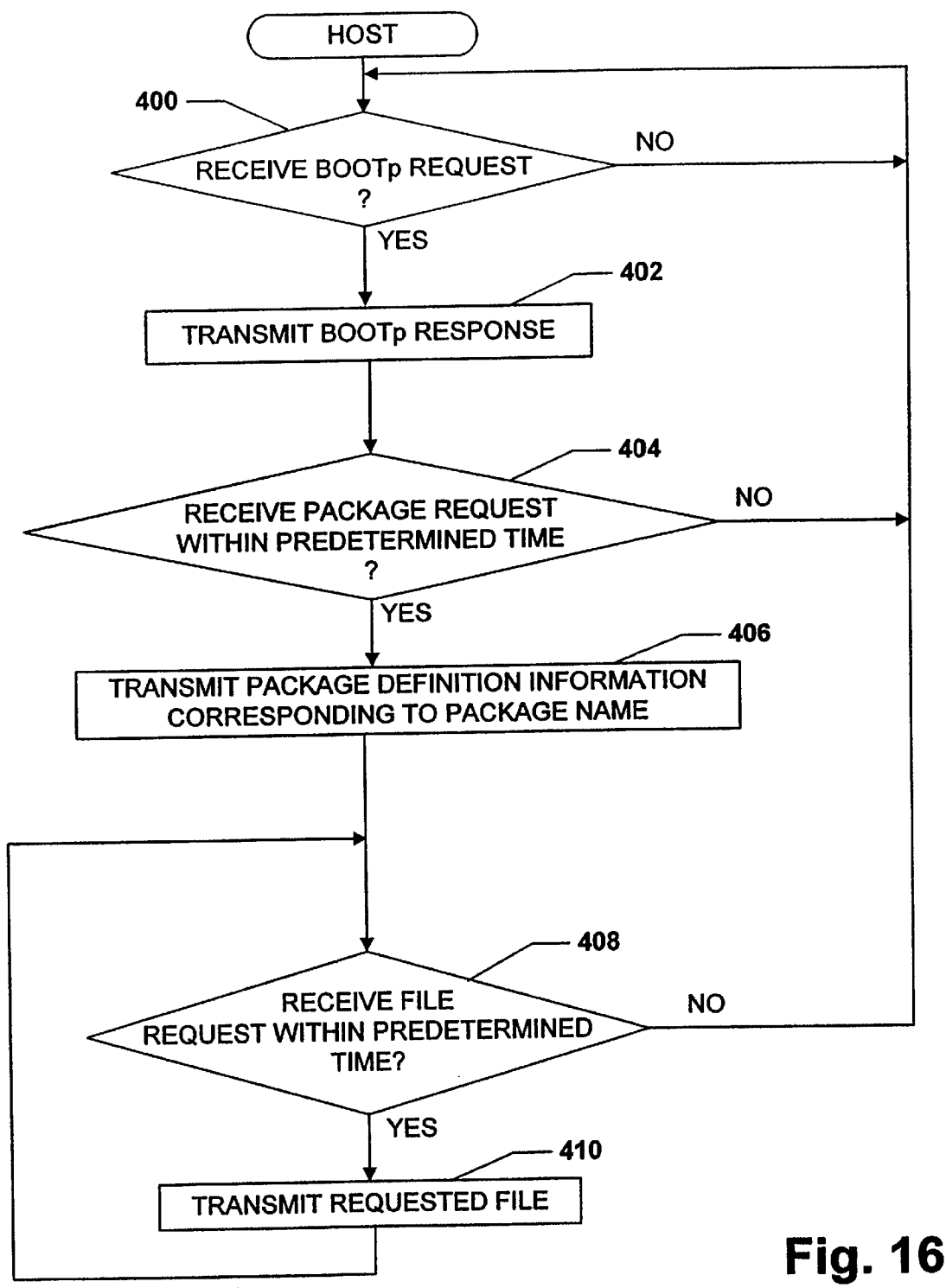
FIG. 16 is a system flowchart suitable setting up the host computer to respond to the mobile terminal seeking upgraded operating software in accordance with an alternative embodiment of the present invention.

Referring briefly to FIG. 16, the operation of the host computer 30 is illustrated during the boot-up routine of the mobile terminal 36. Beginning in step 400, the host computer processor 64 determines if a Bootp Request Packet 300 has been received from a mobile terminal 36 as represented in FIG. 14(a). If not, the processor 64 continues to loop through step 400. If a Bootp Request Packet 300 is received, the processor 64 proceeds to step 402 in which the processor 64 transmits a Bootp Response Packet 310 in response as represented in FIG. 14(b). Next, in step 404 the processor 64 determines if the host computer 30 receives a Package Request Packet 318 within a predetermined period of time (e.g., five seconds). If not, the processor 64 returns to step 400. Otherwise, upon receiving the Package Request Packet 318 (as represented in FIG. 14(c)), the processor 64 proceeds from step 404 to step 406. In step 406 the processor 64 transmits back to the mobile terminal 36 the package definition packet 324 corresponding to the package name included in the Package Request Packet 318 as represented in FIG. 14(d).

Following step 406, the processor 64 determines in step 408 whether a file request packet 330 is subsequently received from the mobile terminal 36 within a predetermined period of time (e.g., five seconds). If not, the processor 64 returns to step 400. If a file request packet 330 is received as represented in FIG. 14(e), the processor 64 proceeds to step 410 in which the processor 64 transmits the requested file to the mobile terminal 36 in a file packet 334 (FIG. 14(f)). Following step 410, the processor 64 returns to step 408 to await a file request for another file. In this manner, the host computer 30 and a mobile terminal 36 requiring a new version of operating software will exchange file request packets 330 and file packets 334 until all of the files have been downloaded to the mobile terminal 36.

Those having ordinary skill in the art will appreciate that steps 400 and 402 in FIG. 16 can be carried out by a Bootp server (not shown) included in the host computer 30. Steps 404–410 may be carried out separately by an FTP server (not shown) which also is included in the host computer 30.

Figure 17:
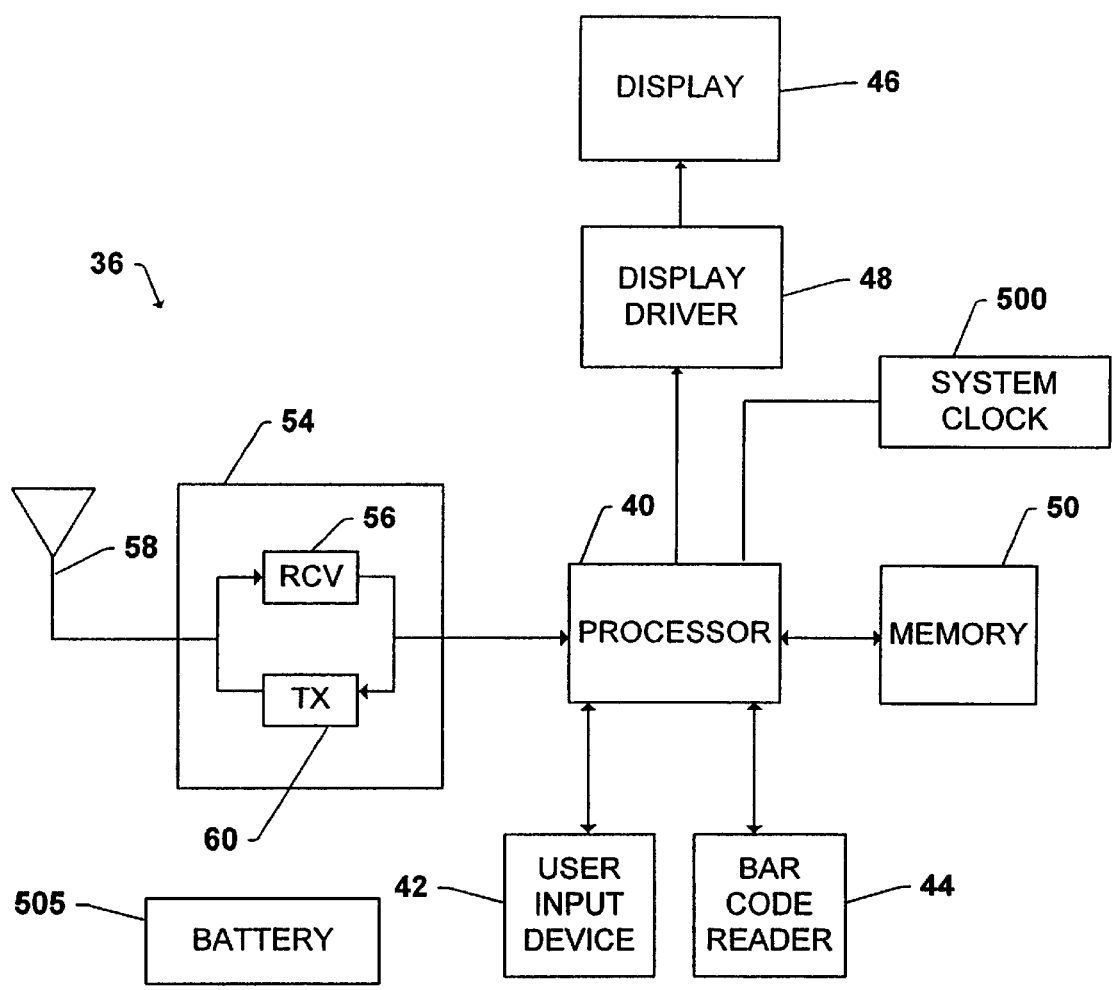
FIG. 17 is a block diagram of a mobile terminal in accordance with another alternative embodiment of the present invention.

Turning now to FIG. 17, an additional feature of the present invention is described in which the mobile terminals 36 have pre-scheduled times at which each mobile terminal 36 inquires as to whether a software upgrade is needed. For example, in order to avoid normally busy times, the mobile terminals 36 may wake from a sleep mode during late evening or early morning hours and transmit an inquiry to the host computer 30 to determine whether a software upgrade is needed.

The mobile terminals 36 are configured in substantially the same manner as described above with respect to FIG. 2. Accordingly, components having like reference numerals will not again be discussed for sake of brevity. In the present embodiment, each mobile terminal 36 includes a system clock 500 coupled to the processor 40. The system clock 500 may, for example, include a crystal oscillator for providing a 60 Hz timing pulse to the processor 40 on a continuous basis. Of course, oscillators operating at various other frequencies could also be used. The clock 500 may be of any conventional type as is well known in the art. Although the present embodiment depicts the clock 500 to be a separate stand-alone component, it will be appreciated that the clock 500 could be included as part of the internal circuitry of the processor 40 and/or be software controlled. A rechargeable battery 505 is also shown within the mobile terminal 36 for providing power to each of the components. In the present embodiment, the battery is a Ni—Cd battery, however, it will be appreciated that other types of batteries could alternatively be used.

Figure 18:
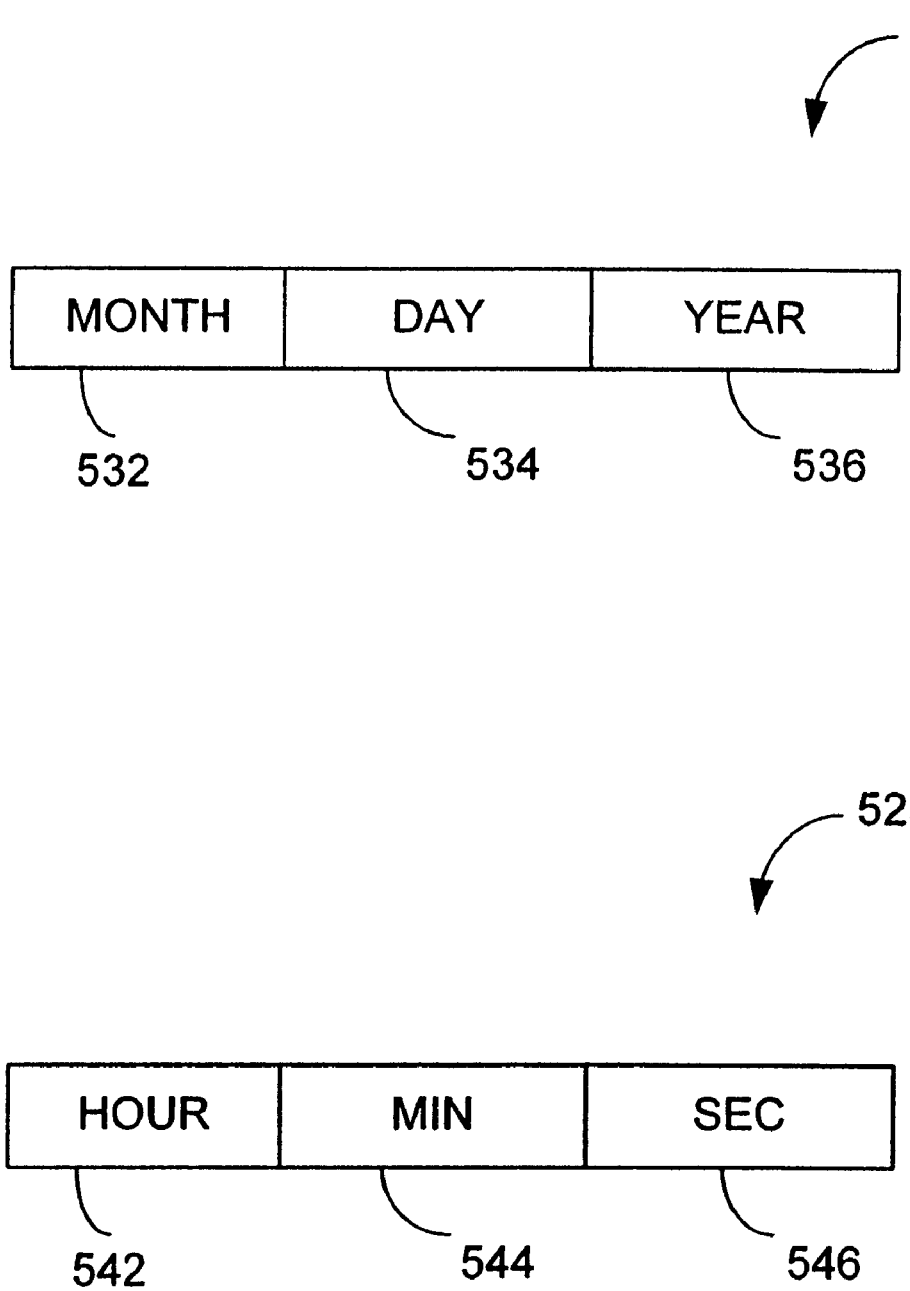
FIG. 18 is a representation of a date keeper and time keeper stored in memory of the mobile terminal of FIG. 17.

Referring now to FIG. 18, an internal date keeper 510 and time keeper 525 maintained by the mobile terminal 36 are depicted. Each of the data keeper 510 and time keeper 510 is maintained in the memory 50 of the mobile terminal 36 and is continually updated by the processor 40 in accordance with clock signals received from the clock 500. The data keeper 510 includes a two digit month field 530, a two digit day field 532 and a four digit year field 536. The time keeper 525 maintains time in military time format and includes a two digit hour field 542, a two digit minute filed 544, and a two digit second field 546. Additional features of both the data keeper 510 and time keeper 525, such as automatically adjusting for daylight savings time and/or leap year variations, is also preferably programmed into the processor 40 in accordance with known techniques in the art.

Each of the data keeper 510 and time keeper 525 may be accessed, displayed and/or changed by a user using the user input device 42 and display 46 associated with the mobile terminal 36. In the present embodiment, each of the date keeper 510 and time keeper 525 are initially set by a system operator or user prior to operation in the cellular communication system 20. In this manner, the date and time maintained by each of the mobile terminals is substantially synchronized.

Figure 19:
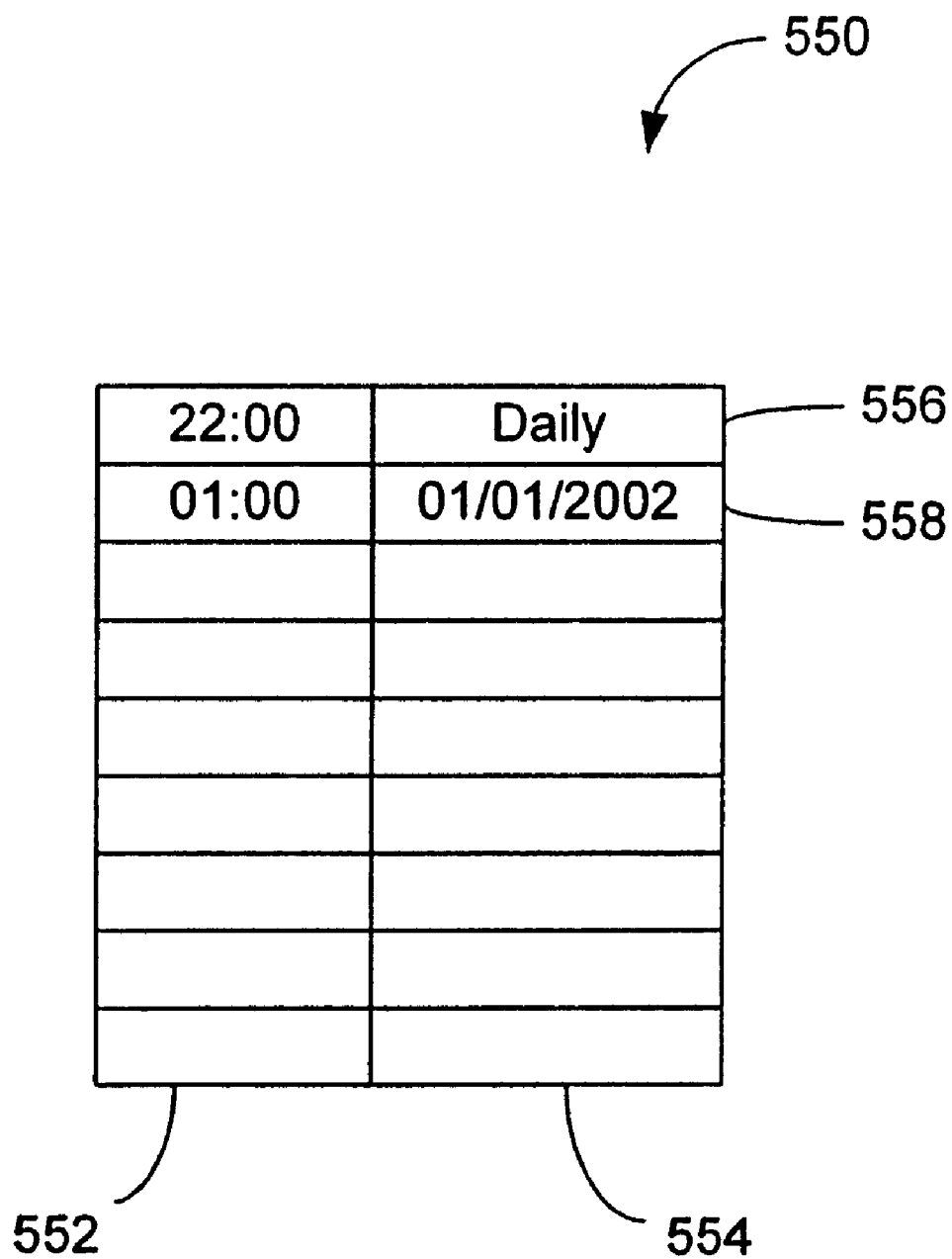
FIG. 19, is a software update schedule table stored in memory of the mobile terminal of FIG. 17.

Referring now to FIG. 19, a software update schedule table 550 (hereinafter referred to as scheduling table 550) stored in the memory 50 of the mobile terminal 36 is depicted. The scheduling table 550 provides the mobile terminal 36 with a list of times during which the mobile terminal 36 is scheduled to determine whether a software upgrade is needed. As will be discussed in more detail below, entries in the scheduling table 550 may be preprogrammed by a user or may be entered and/or updated in response to wireless communications received from the host computer 30 or other device.

As shown in FIG. 19, the scheduling table 550 includes two columns. A time column 552 and a frequency column 554. The time column 552 provides a scheduled time of day at which the mobile terminal 36 is to transmit a package request packet 318 (FIG. 14(c)) to the host computer 30 in order to determine whether a software upgrade is needed. The frequency column 554 provides a frequency of occurrence of dates on which the mobile terminal 36 is to initiate the request at the time provided. For example, the frequency column 554 may indicate that a request at the given time should be made on a daily basis, weekly basis, monthly basis, or on a specified date or dates. In the present example, a first entry 556 in the scheduling table 550 indicates that the mobile terminal 36 is to initiate a request to determine whether a software upgrade is needed at 22:00 (e.g. 10:00 pm) on a daily basis. Additionally, a second entry 558 indicates that an additional request should be made at 1:00 (e.g. 1:00 am) on a specified date, perhaps corresponding to a date upon which a software upgrade is scheduled to be installed at the host computer 30 or FTP server 31. Accordingly, instead of, or in addition to, inquiring for update information during the mobile terminal 36 boot-up procedure as discussed above with respect to FIGS. 14(a)–14(h), the present embodiment allows the timing of such requests to be scheduled at one or more desired times. Advantageously, as discussed below, such scheduled times may be during evening hours or lower demand periods when the host computer 30 and FTP server 31 are not overloaded with activity.

Figure 20:
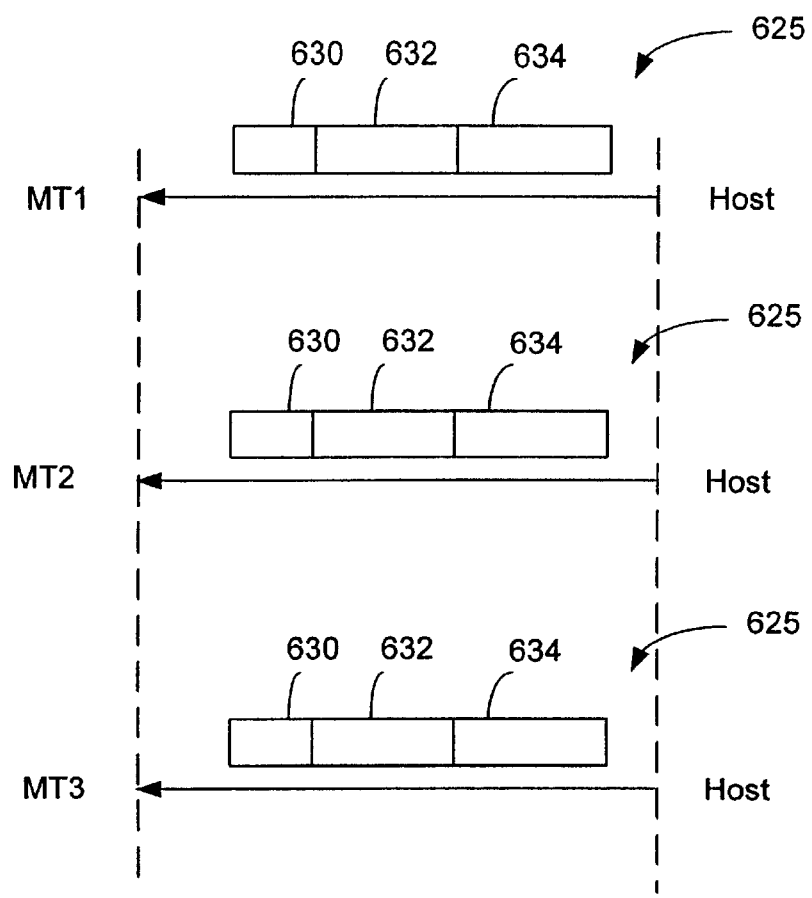
FIGS. 20(a)–20(d) are diagrams depicting an exchange of data between the mobile terminal and the host computer in accordance with the another alternative embodiment of the present invention.

As mentioned above, the entry of time in the scheduling table 550 may be manually entered by a user or entered and/or updated through wireless communication from the host computer 30 or other device. For example, referring briefly to FIG. 20 there is depicted a packet exchange between the host computer 30 and three mobile terminals MT1, MT2, MT3, with which the host computer 30 schedules time to initiate a software upgrade inquiry.

More particularly, as shown in FIGS. 20a–c, during an active session the host computer 30 transmits a host scheduling table request packet 600 to each of the respective mobile terminals MT1, MT2, MT3. The scheduling table request packet 600 includes a header portion 602 and request for scheduling table field 604. The request for scheduling table field 604 is used to indicate to the mobile terminals that the host computer 30 would like a copy of each of the mobile terminal's respective scheduling tables 550.

Accordingly, in response to receiving the respective scheduling table request packet 600, each mobile terminal MT1, MT2, MT3, replies by transmitting a scheduling table reply packet 610. The scheduling table reply packet 610 includes a header 612 and a table field 614. The table field 614 includes a copy of the content of the scheduling table 550 currently stored in each of the mobile terminal MT1, MT2, MT3. Upon receipt of the each scheduling table reply packet 610, the host computer 30 stores the information in memory 66 (FIG. 3(a)) for future processing. It will be appreciated that while the present embodiment depicts the host computer 30 communicating with three different mobile terminals MT1, MT2, MT3 the host computer 30 could, in an alternative embodiment, be programmed to retrieve scheduling table information from zero to all of the mobile terminals operating in the system 20.

Next, as shown with respect to FIG. 20(d) the host computer 30 is configured to transmit a host scheduling packet 625 to each mobile terminal MT1, MT2, MT3 in order to schedule times for wireless upgrades to take place. Each scheduling packet 625 includes a header 630, a revision field 632 and a scheduling time field 634. The revision field 632 provides indicia to the mobile terminal of those entries in the current scheduling table 550 of which the host computer 30 would like to modify or eliminate. For example, if the scheduling table 550 shown in FIG. 19 were associated with mobile terminal MT1, the revision field 632 may indicate that with respect to the first entry 556, the time in column 552 should be changed from 22:00 (10:00 pm) to 23:00 (11:00 pm). Further the revision field 632 may indicate that the second entry 558 should be removed from the scheduling table 550. Alternatively, of course, the revision field 632 may indicate that no changes are to be made to the current entries of the scheduling table 550.

The scheduling time field 634 provides each mobile terminal MT1, MT2, MT3, with additional time and frequency entries which the host computer 30 would like to have entered into each scheduling table 550. For example, it may be known that a new version of software will be loaded in either the host computer 30 or FTP server 31 at some date in the future. Thus, to provide for each mobile terminal to be updated in a timely fashion, the host computer 30 may transmit a host scheduling packet 625 to each mobile terminal MT1, MT2, MT3, requesting them to initiate a software update at some predetermined time following the known update to the host computer 30 and/or FTP server 31.

According to the present embodiment, preferably the host computer 30 is programmed to schedule the respective mobile terminals MT1, MT2, MT3 to initiate a software update in a staggered, sequential fashion. For example, MT1, may be scheduled to initiate the update at some time T1 on a specified date, while MT2 is scheduled to initiate the update on the same specified date but at a time T2 which is approximately 15 minutes after time T1, and MT2 is scheduled at a time T3 which is approximately 15 minutes after time T2. The time between updates is preferably sufficient for each mobile terminal to complete any needed data exchanges with the host computer to obtain upgrades operating software or the like. Further, in the present embodiment, the host computer 30 preferably schedules the mobile terminals MT1, MT2, MT3 to initiate the updates during off-peak load hours. For example, the host computer 30 may schedule the mobile terminals to initiate a software upgrade late in the evening when the host computer 30 and FTP server 31 are not in high demand. In the event the initiation of a software upgrade is scheduled during a time when any of the mobile terminals MT1, MT2, MT3 are in a reduced power state (e.g. a sleep mode), the present embodiment further provides for the mobile terminal to temporarily awaken from the sleep mode to exchange the packets needed to obtain the upgrade.

Accordingly, upon the mobile terminals 36 determining that it is scheduled to initiate a software upgrade based on an entry in its scheduling table 550, the mobile terminal 36 proceeds to follow the same package exchange with the host computer 30 and FTP server 31 as described in the above embodiments such as with respect to FIGS. 14(c)–14(h).

Figure 21:
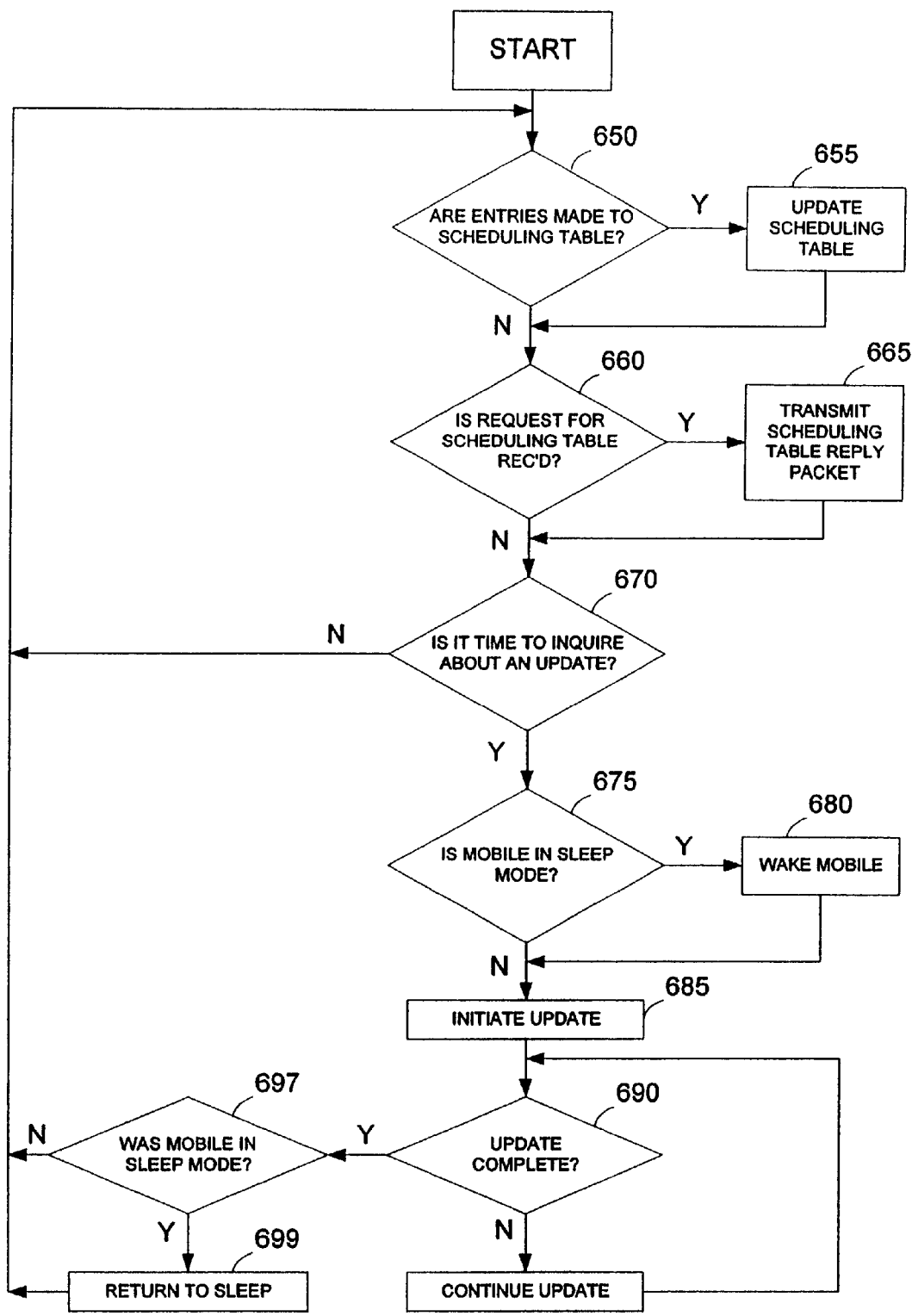
FIG. 21 is a flowchart depicting the operations of the mobile terminal of FIG. 17 in accordance with the another alternative embodiment of the present invention.

Referring now to FIG. 21, a flow chart depicting the steps performed by the processor 40 of the mobile terminal 36 in initiating scheduled software updates is provided. In particular, beginning at step 650, the processor 40 initially determines whether an update or entry to the scheduling table 550 is made. An update or entry to the scheduling table 550 may be made manually by a user of the mobile terminal 36 through the user input device 42 or wirelessly through communication with the host computer 30 or other device in a manner described above with respect to FIG. 20(d). In the event the processor 40 determines an entry or update to the scheduling table 550 has been presented, the processor 40 proceeds to step 655 where the processor 40 updates the scheduling table 550 accordingly. In the event no entry or update is detected, or following step 655, the processor 40 proceeds to step 660.

In step 660, the processor 40 determines whether a request for scheduling table packet 600 is received from the host computer 30 or other device. In the event a request for scheduling table packet 600 is received, the processor 40 proceeds to step 665 where a scheduling table reply packet 610 is transmitted back to the requesting device. In the event no request for scheduling table packet 600 is received, or following step 665, the processor proceeds to step 670.

In step 670, the processor 40 determines whether it is scheduled to initiate a software update inquiry. In order to determine if it is time for a scheduled update, the processor 40 performs a comparison of each entry in the scheduling table 550 with the current time and date stored in the date keeper 510 and time keeper 525. In the event the processor 40 determines it is not time for a software update inquiry, the processor 40 returns to step 650. If, however, the processor 40 determines it is time for a software update inquiry, the processor 40 proceeds to step 675.

In step 675 the processor 40 determines if the mobile terminal 36 is in a sleep mode. If the mobile terminal 36 is in a sleep mode, the processor 40 continues to step 680. In step 680 the processor 40 causes the battery 505 (FIG. 17) to provide full operating power to all of the components of the mobile terminal 36. Following step 680, or in the event the processor 40 determines the mobile terminal 36 was not in a sleep state in step 675, the processor proceeds to step 685.

In step 685, the processor 40 initiates a software update inquiry and download process as, for example, shown with respect to FIGS. 14(c)–14(h) above. Next, in step 690, the processor 40 determines whether the software update inquiry and download process is complete. If the processor 40 determines the process in not complete, the processor 40 proceeds to step 695 where the processor 40 continues the software update inquiry and download process. Following step 695, the processor returns to step 690.

In the event the processor 40 determines the software update inquiry and download process is complete, the processor 40 proceeds to step 697. In step 697, the processor 40 determines whether the mobile terminal 36 was in a sleep mode prior to entering step 685 where the processor 40 initiated the software update inquiry and download process. If the processor 40 determines the mobile terminal 36 was in a sleep mode, the processor 40 returns the mobile terminal to a sleep mode in step 699. Following step 699, or in the event the processor 40 determined the mobile terminal 36 was not in a sleep mode in step 697, the processor 40 returns to step 650.

Figure 22:
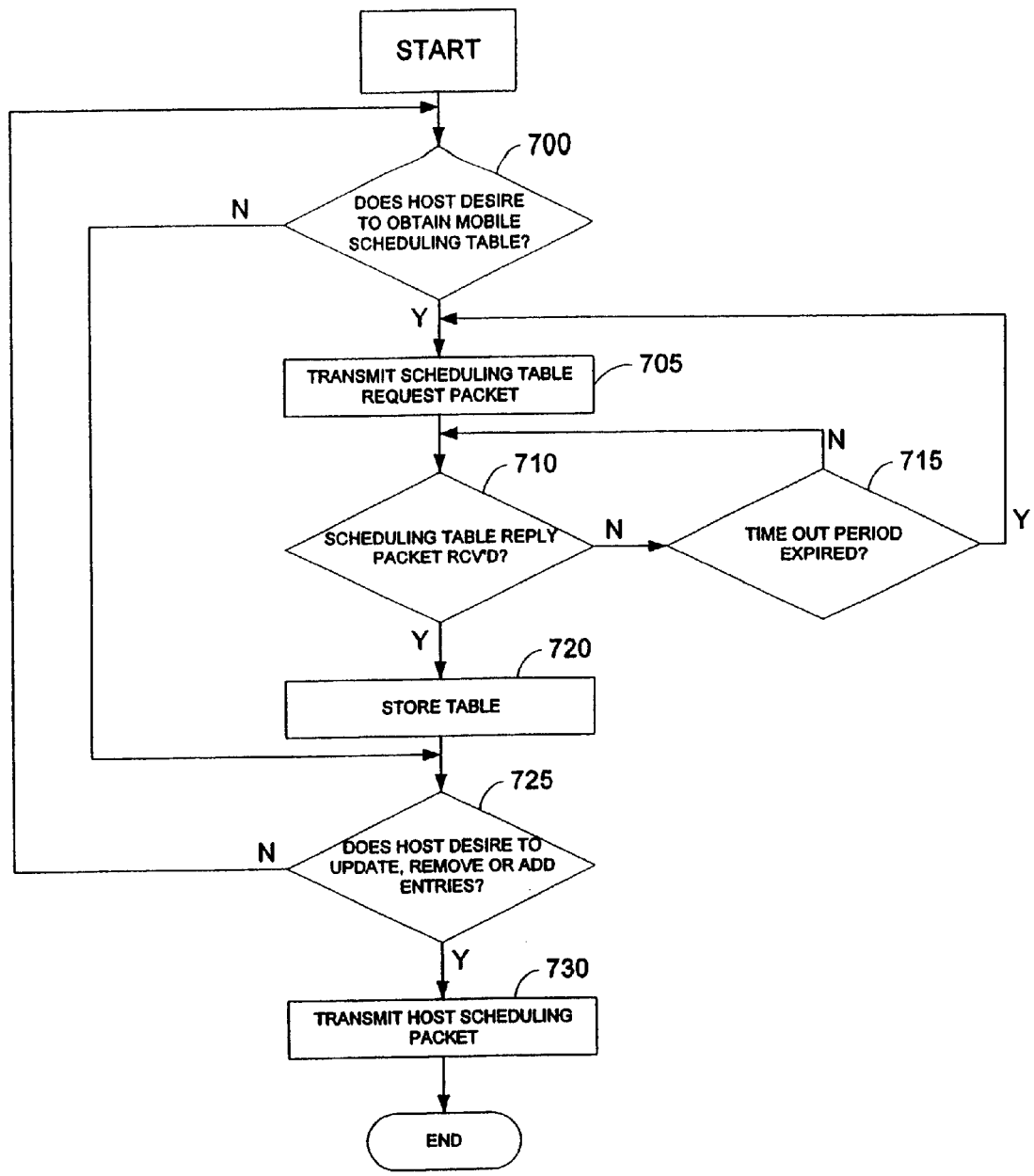
FIG. 22 is a flowchart depicting the operations of the host computer in accordance with the another alternative embodiment of the present invention.

Referring now to FIG. 22, a flow chart depicting the steps taken by the processor 64 of the host computer 30 in managing the scheduling table 550 of each mobile terminal 36 is depicted. Beginning at step 700, the processor 64 initially determines whether the host computer 30 is configured to retrieve a scheduling table from a mobile terminal 36. For example, the host computer 30 may be preprogrammed to retrieve the scheduling tables of one or more mobile terminals 36 or a user of the host computer 30 may manually enter a command in the host computer 30 requesting a particular scheduling table 550 be retrieved. In the event the processor 64 determines the host computer 30 is configured to retrieve a scheduling table 550, the processor 64 proceeds to step 705.

In step 705, the processor 64 transmits a scheduling table request packet 600 to the mobile terminal 36 from which a scheduling table is desired. Next, in step 710, the processor 64 determines whether a scheduling table reply packet 610 has been received. If a scheduling table reply packet 610 has not been received, the processor 64 proceeds to step 715. In step 715, the processor 64 determines whether a time out period has expired since the scheduling table request packet 600 was originally transmitted. If the processor 64 determines the time out period has not expired, the processor returns to step 710. Otherwise the processor 64 returns to step 705 where the scheduling table request packet 600 is again transmitted to the desired mobile terminal 36.

If in step 710, the scheduling table reply packet 610 is received, the processor 64 proceeds to step 720 where the information provided is stored in the memory 66 of the host computer 30. In this manner, the host computer 30 can review the contents of the scheduling table 550 received to determine if any changes are desired.

Following step 720, or in the event in step 700 the processor 64 determines it does not wish to receive a mobile terminal scheduling table 550, the processor 64 proceeds to step 725. In step 725, the processor 64 determines whether the host computer 30 desires to transmit a host scheduling packet 625 to the mobile terminal 36 to update, remove, and/or add an entry to the scheduling table 550. It will be appreciated that the processor 64 may determine an addition to a scheduling table 550 for a given mobile terminal 36 is appropriate even if the host computer 30 has never received a scheduling table 550 for that mobile terminal 36. If the processor 64 determines an update, removal, and/or addition to a scheduling table 550 is not appropriate, the processor 64 returns to step 700. However, if in step 725 the processor 64 determines an update, removal, and/or addition is appropriate, the processor 64 proceeds to step 730 where the processor 64 transmits a host scheduling packet 625 to the mobile terminal 36 as described above with respect to FIG. 20(d).

Although the invention has been shown and described with respect to certain preferred embodiments, it is obvious that equivalents and modifications will occur to others skilled in the art upon the reading and understanding of the specification. For example, an alternative embodiment has been described with respect to the mobile terminal 36 comparing the version of operating software it currently has stored within its memory with the version of software stored in the host computer 30; and if the mobile terminal 36 has a different version of operating software stored within, it issues a request to the host computer 30 to transmit to the mobile terminal 36 an upgraded version of the operating software. However, it will be appreciated that the host computer 30 can make the comparison of the operating software within to that stored in the mobile terminal 36 based on version information provided by the mobile terminal 36 to the host computer 30 in the Bootp Request packet, for example. If the host computer 30 determines the mobile terminal 36 has a different version of operating software than the host computer 30, the host computer 30 can make the determination to upgrade the operating software of the mobile terminal 36 and transmit to the mobile terminal 36 an upgraded version of the software.

Furthermore, the file transfer protocol utilized in any of the embodiments of the present invention for transferring files between the mobile terminal and the host computer is not limited to any particular file transfer protocol. Any of a variety of known protocols such as TASP, FTP and TFTP can be used without departing from the scope of the invention.

The present invention includes all such equivalents and modifications, and is limited only by the scope of the following claims.

What is claimed is:

1. In a wireless communication system comprising a system backbone; a host computer coupled to the system backbone; at least one base station coupled to the system backbone, the at least one base station including a base station transceiver for communicating wirelessly with mobile devices within the system; and at least one mobile device having a mobile device transceiver for communicating wirelessly with the host computer on the system backbone via the at least one base station, a method of operation comprising the steps of:

maintaining a software update schedule table indicating at least one time at which the at least one mobile device is to inquire as to whether an upgrade of operating software is available;

determining whether the software update schedule table indicates it is time to inquire as to whether an upgrade of operating software is available and, if so, determining whether a version of the operating software stored in the at least one mobile device is a current version of the operating software; and wirelessly updating the operating software stored in the at least one mobile device if it is determined that the operating software stored in the at least one mobile device is not the current version.

2. The method of claim 1, further comprising the step of updating the software update schedule.

3. The method of claim 2, wherein said step of updating the software update schedule comprises the step of modifying an entry in the software update schedule table.

4. The method of claim 2, wherein said step of updating the software update schedule comprises the step of adding an entry to the software update schedule.

5. The method of claim 2, wherein said step of updating the software update schedule comprises the step of deleting an entry in the software update schedule.

6. The method of claim 2, wherein said step of updating the software update schedule comprises wirelessly modifying the software update schedule.

7. The method of claim 2, wherein said step of updating the software update schedule comprises the step of modifying, entering and/or deleting an entry in the software update schedule.

8. The method of claim 7, wherein said step of updating the software update schedule comprises wirelessly updating the software update schedule.

9. The method of claim 7, wherein said step of updating the software update schedule comprises manually entering data through a user input device to update the software update schedule.

10. The method of claim 9, wherein the user input device is coupled to the at least one mobile device.

11. The method of claim 1, wherein the system includes a plurality of mobile devices communicating with the host computer and a respective software update schedule for each of the plurality of mobile devices.

12. The method of claim 11, wherein each of the respective software update schedule tables includes a time entry staggered by a predetermined time interval from another time entry in a different one of the respective software update schedule tables.

13. The method of claim 12, wherein the predetermined time interval is at least a sufficient amount of time to complete wirelessly updating of the operating software.

14. The method of claim 1, further comprising the step of waking the mobile device from a sleep mode prior to said step of determining whether a version of the operating software stored in the at least one mobile device is a current version of the operating software.

15. The method of claim 14, further comprising the step of reentering the mobile device into a sleep mode after said step of wirelessly updating the operating software.

16. The method of claim 1, wherein the time the software update schedule table indicates that it is time to inquire as to whether an upgrade of operating software is available corresponds to a time when the host computer is at a low-load level, whereby said step of determining whether a version of the operating software stored in the at least one mobile device is a current version of the operating software is performed at a time when the host computer is at a low-load level.

17. A wireless communication system, comprising:

a system backbone;

a host computer coupled to the system backbone;

at least one base station coupled to the system backbone, the at least one base station including a base station transceiver for communicating wirelessly with mobile devices within the system;

at least one mobile device having a mobile device transceiver for communicating wirelessly with the host computer on the system backbone via the at least one base station;

a software update schedule table which provides at least one time to inquire as to whether an updating of mobile device operating software is appropriate; and a comparison device which determines, at a time provided by the software update schedule table, whether an update of the mobile device operating software is appropriate based on an initial comparison in accordance with a predetermined criteria indicative of whether updating of the mobile device operating software is appropriate.

18. The system of claim 17, wherein the at least one time provided with the software update schedule table has associated therewith a frequency of occurrence.

19. The system of claim 17, wherein the frequency of occurrence is daily, weekly, and/or monthly.

20. The system of claim 17, wherein the frequency of occurrence is a specified one or more dates.

21. The system of claim 17, further comprising a date keeper and a time keeper for determining whether the at least one time has arrived.

22. The system of claim 17, wherein the at least one time corresponds to a time when the host computer is at a low-load level.

\* \* \* \* \*